(12) United States Patent
Thantry et al.

(10) Patent No.: US 9,424,031 B2
(45) Date of Patent: Aug. 23, 2016

(54) TECHNIQUES FOR ENABLING BIT-PARALLEL WIDE STRING MATCHING WITH A SIMD REGISTER

(71) Applicant: Intel Corporation, Santa Clara, CA (US)

(72) Inventors: Hariharan Thantry, Santa Clara, CA (US); Mani Azimi, Menlo Park, CA (US)

(73) Assignee: INTEL CORPORATION, Santa Clara, CA (US)

( * ) Notice: Subject to any disclaimer, the term of this patent is extended or adjusted under 35 U.S.C. 154(b) by 689 days.

(21) Appl. No.: 13/802,361

(22) Filed: Mar. 13, 2013

(65) Prior Publication Data

US 2014/0281371 A1   Sep. 18, 2014

(51) Int. Cl.
  *G06F 9/30* (2006.01)

(52) U.S. Cl.
  CPC ........ *G06F 9/30036* (2013.01); *G06F 9/30018* (2013.01)

(58) Field of Classification Search
  CPC .......................... G06F 9/30036; G06F 9/30018
  USPC ....................................................... 712/300
  See application file for complete search history.

(56) References Cited

U.S. PATENT DOCUMENTS

| | | |
|---|---|---|
| 6,523,108 B1 | 2/2003 | James et al. |
| 2003/0051043 A1 | 3/2003 | Wyschogrod et al. |
| 2004/0078556 A1 | 4/2004 | Spracklen |
| 2008/0040345 A1* | 2/2008 | Cameron ................. G06F 7/02 |
| 2010/0115232 A1* | 5/2010 | Johnson ................. G06F 7/505 712/4 |
| 2012/0203754 A1 | 8/2012 | Biran et al. |

OTHER PUBLICATIONS

International Search Report and Written Opinion received for PCT Patent Application No. PCT/US2014/019222, mailed Jun. 18, 2014, 10 pages.

* cited by examiner

*Primary Examiner* — William B Partridge
*Assistant Examiner* — William Nguyen

(57) ABSTRACT

Various embodiments are generally directed to overcoming limitations of vector registers in their use with bit-parallel string matching algorithms. An apparatus includes a processor element; and logic to receive a pattern comprising a first string of elements to employ in a string matching operation, instantiate a test bitmask in a first vector register of the processor element, the first vector register comprising multiple lanes, copy bit values at MSB bit positions of the multiple lanes of the first vector register to a first vector mask as a vector value, bit-shift the vector value as a scalar value, bit-shift the first vector register, employ the vector value of the first vector mask to selectively fill LSB bit positions of lanes of a second vector register of the processor element; and OR the second vector register into the first vector register. Other embodiments are described and claimed.

25 Claims, 17 Drawing Sheets

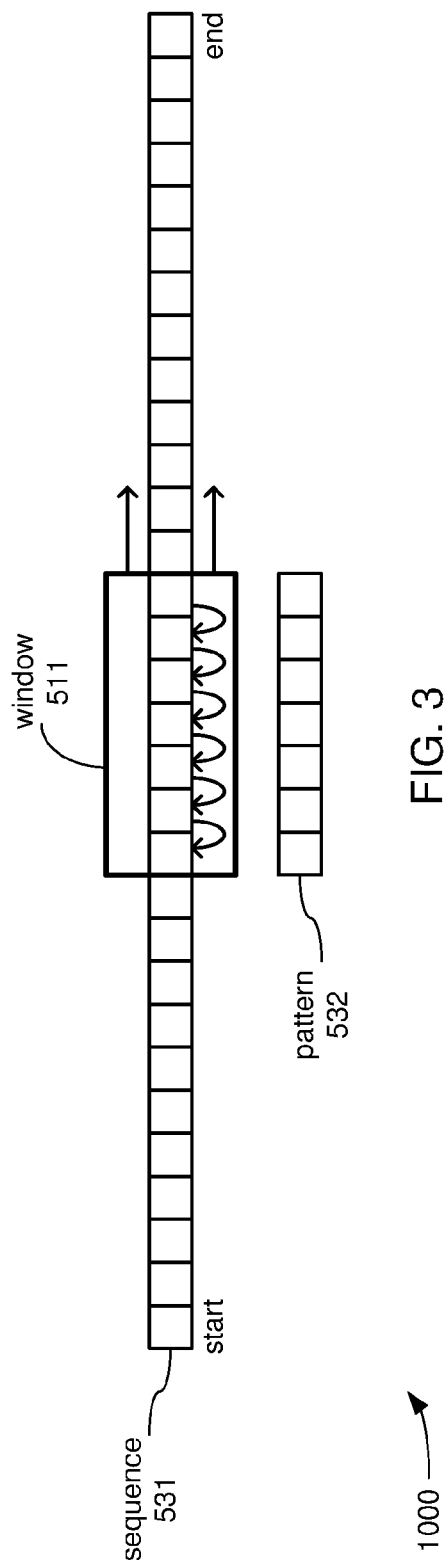

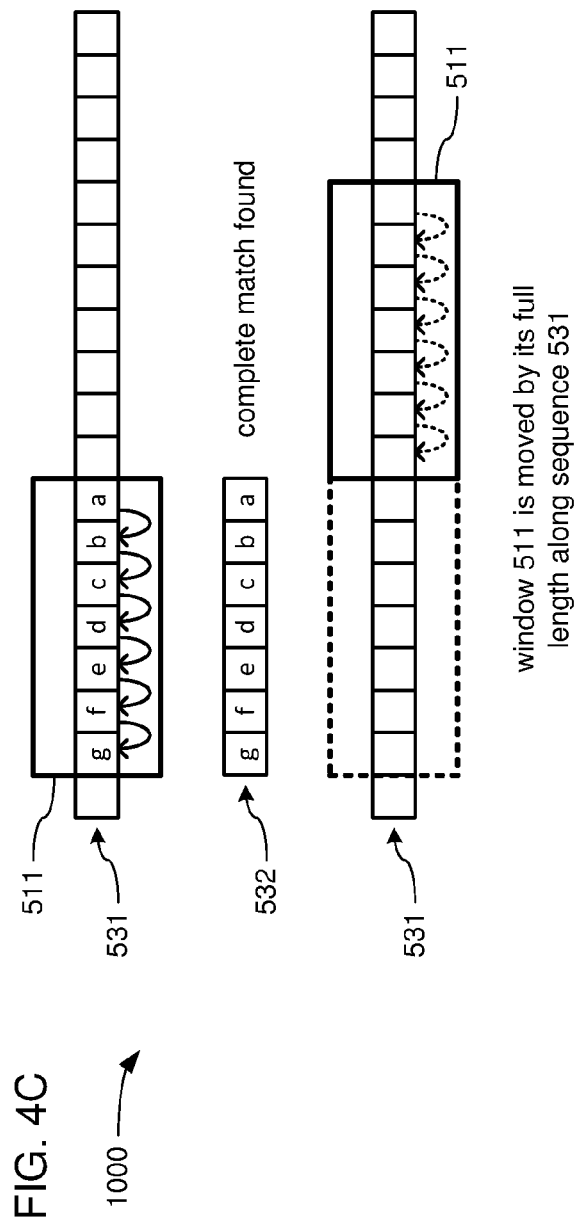

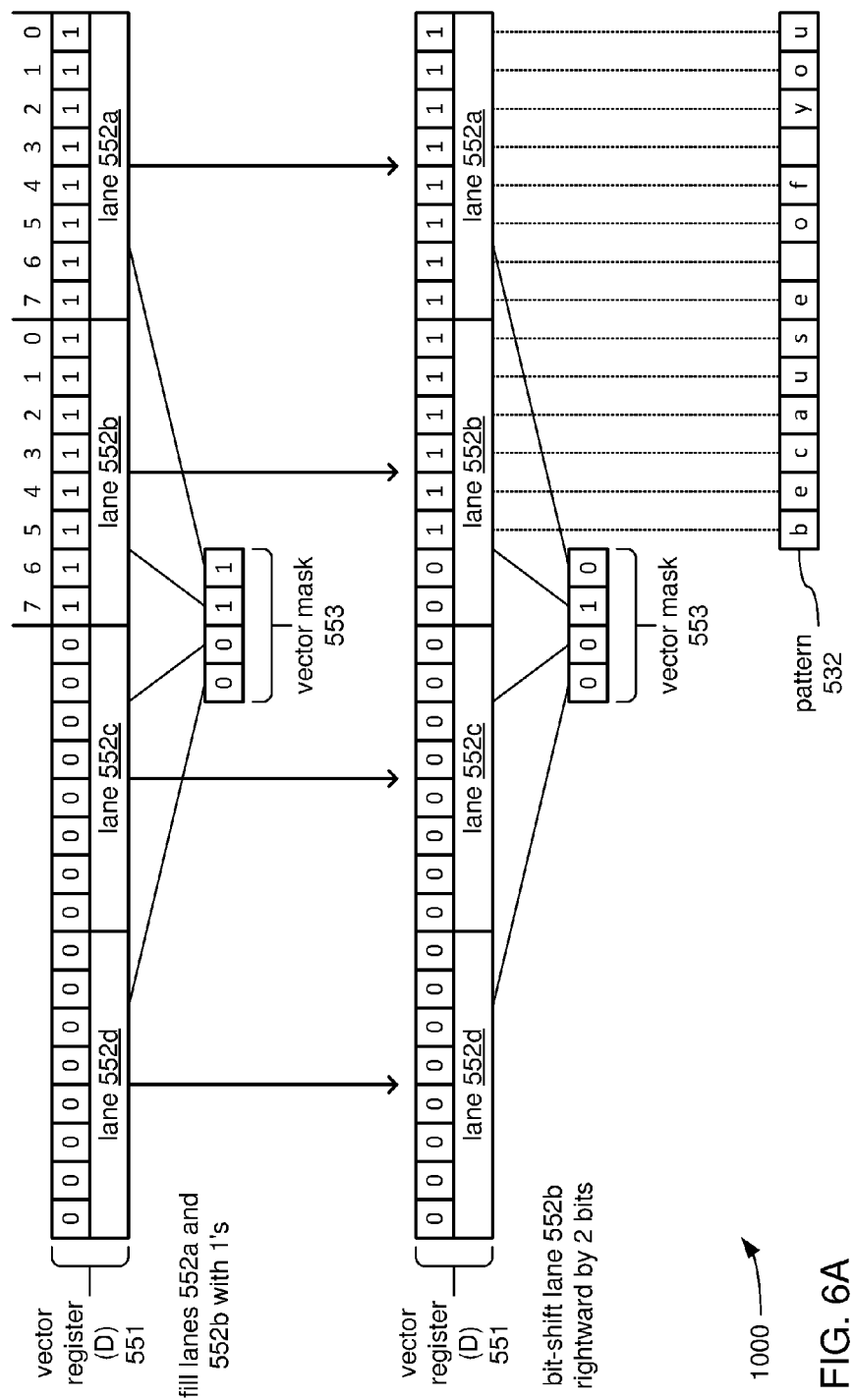

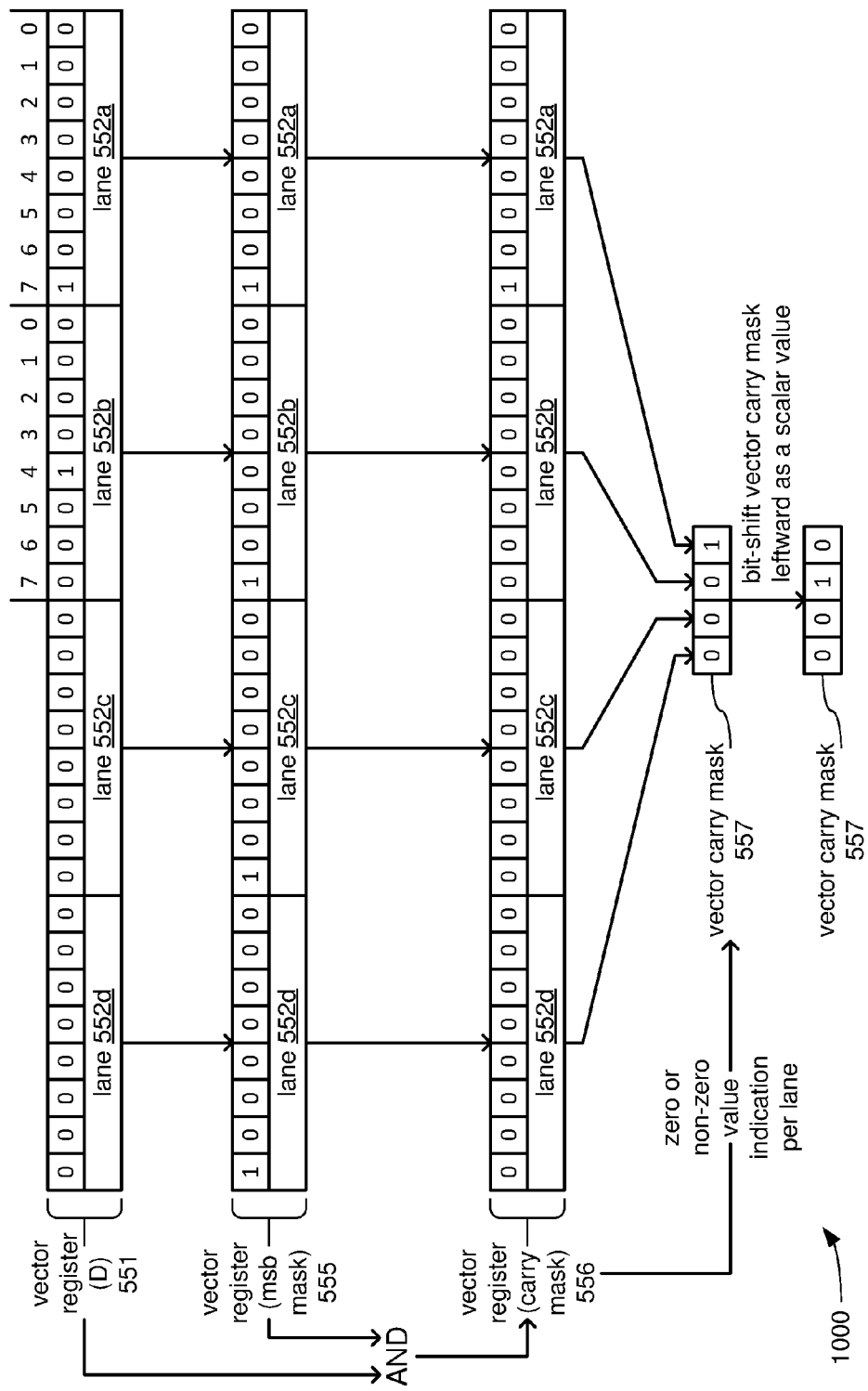

TECHNIQUES FOR ENABLING BIT-PARALLEL WIDE STRING MATCHING WITH A SIMD REGISTER

TECHNICAL FIELD

Embodiments described herein generally relate to enabling efficient use of the full width of a SIMD register in bit-parallel matching

BACKGROUND

String matching algorithms are widely used in the areas of network security, encryption, business analytics, processing of scripting and markup languages, search engines, and as a component of software compilers and interpreters. As a result of their prevalent use, a considerable proportion of available computing power in numerous situations is devoted to performing these algorithms.

In string matching algorithms, one larger string is searched for occurrences of another smaller string therein. The larger string that is searched is frequently referred to as a "sequence" while the smaller string (that the larger string is searched for occurrences of) is frequently referred to as a "pattern." Both of these strings may be made up of characters, symbols representing information such as DNA sequence elements, or any of a variety of types of data. In essence, a string is a one-dimensional array of data elements, one for each position in the array. The set of the possible values for each element in the array is frequently referred to as an "alphabet."

Over time, numerous variants of string matching algorithms have been devised. Among more recent variants are bit-parallel string matching algorithms employing bit values and bitmasks to represent occurrences of particular data values at each position in the pattern and/or the sequence. Many of these bit-parallel variants achieve considerable efficiency where the length of the pattern (i.e., the number of positions in the one-dimensional array making up the pattern) is less than or equal to the number of bits in one or more registers of a processor. These bit-parallel variants may still be used where the length of the pattern is greater than the number of bits in the registers of a processor, but this results in the need to create data structures in memory to provide the equivalent of a wider processor register.

Processors with registers of 32 or 64 bits in width have long been commonplace, and present wide enough registers to efficiently accommodate bit-parallel string matching algorithms employed for many purposes. Further, recent advances in processor architecture have enabled the introduction of processors with 128 bit, 256 bit and 512 bit registers, thus potentially accommodating ever larger patterns with considerable efficiency. However, given that typical pieces of numerical data often require no more than 64 bits to be represented, registers of greater widths tend to be subdivided into two or more lanes of 64 bits in width or less to enable multiple data values to be held side-by-side. The instruction sets of such processors are also augmented with instructions that enable simultaneous execution of bitwise logic, arithmetic and other instructions on those side-by-side values in parallel. Such registers and instructions are often referred to as "vector registers" and "vector instructions," respectively. Further, processor architectures implementing vector registers with vector instructions are referred to as SIMD (single-instruction-multiple-data) architectures.

One outgrowth of the manner in which such wide registers are subdivided and the manner in which the instruction sets to support their use are implemented is a tendency to provide support only for bit shift operations in which a bit value at one or both ends of a lane within one of these registers is lost. This one implementation detail presents an obstacle to using the full width of such very wide registers in supporting longer patterns. It is with respect to these and other considerations that the embodiments described herein are needed.

BRIEF DESCRIPTION OF THE DRAWINGS

FIG. 3 illustrates conceptual aspects of string matching in the embodiment of FIG. 1.

FIGS. 4A-C illustrate further details of the conceptual aspects of FIG. 3.

FIGS. 6A-E illustrate further aspects of the implementation of FIGS. 5A-B.

DETAILED DESCRIPTION

Figure 1:
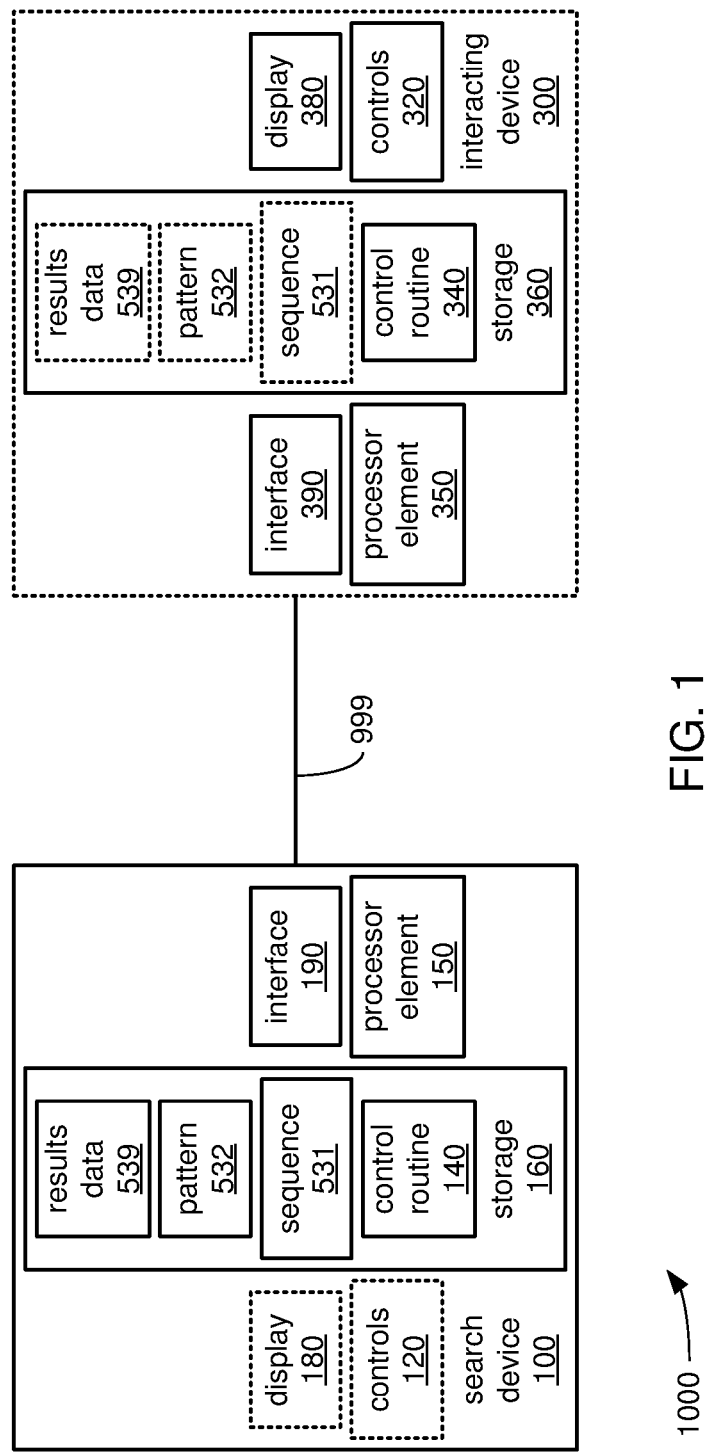
FIG. 1 illustrates aspects of an embodiment of interactions among devices.

Various embodiments are generally directed to augmenting bit-parallel string matching algorithms to overcome bit-shifting limitations of vector registers of a SIMD architecture to enable use of such algorithms with those registers. More specifically, a bit-parallel string matching algorithm is augmented to make use of vector instructions to overcome lane-to-lane limitations in bit-shift operations in which bit values are not carried between lanes of vector registers used for one or more wide bitmasks.

Such a vector register may be employed to store a test bitmask of a type employed by various bit-parallel string matching algorithms that is frequently bit-shifted during performance of those algorithms. As will be described in greater detail, techniques to overcome the loss of carry bit values may include saving copies of the bit values at MSB bit positions through bitwise operations as a vector value in a vector mask, bit-shifting the vector value as a scalar value. The now-shifted vector value is then used to control the filling of LSB bits of another vector register serving as a bit carry mask, and the bit carry mask is ORed with the vector register storing the test bitmask after the test bitmask has been bit-shifted to restore the otherwise missing bit values.

Initialization of such a vector register may entail first selectively filling lanes of the vector register in which the test bitmask is stored, and then bit-shifting the most significant one of those lanes in which the test bitmask is stored to the right to adjust the overall length of the fill value (envisioned as being all 1's, but could be a different fill value) to match the bit length of the test bitmask pattern. Different bit-parallel string matching algorithms shift and/or re-initialize the test bitmask pattern with differing degrees of frequency. However, both occur sufficiently frequently that efficiency of the performance of bit-parallel matching algorithms may be markedly enhanced through the use of the techniques described herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
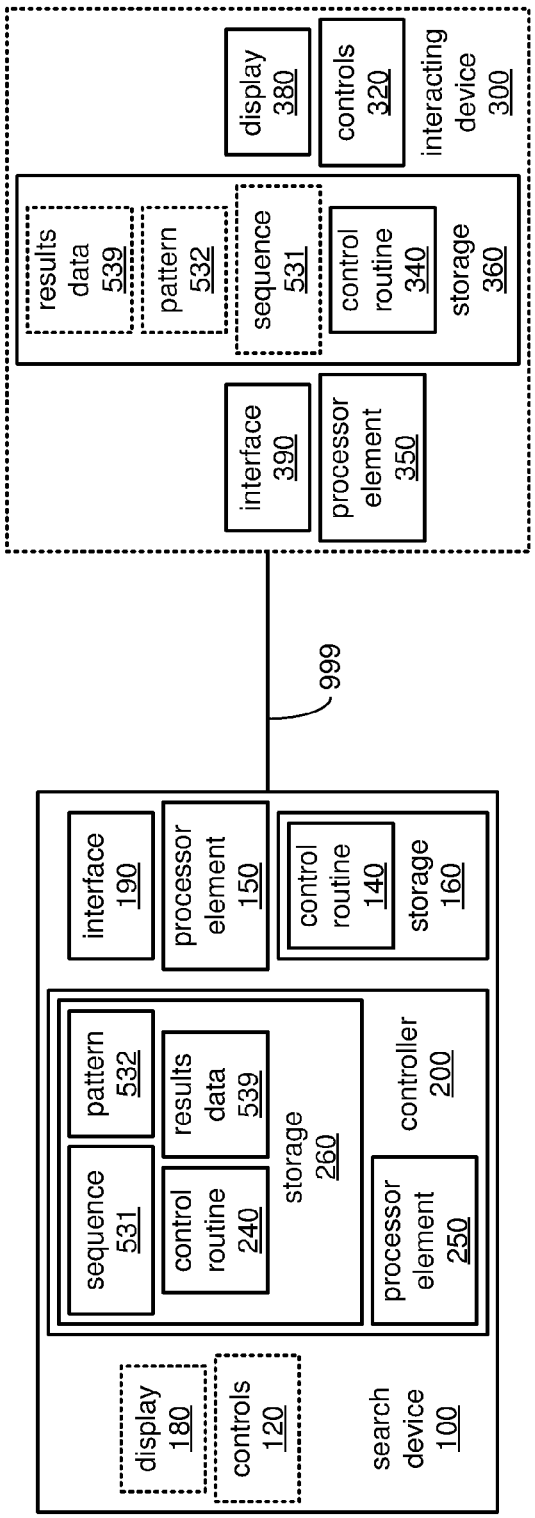
FIG. 2 illustrates aspects of a variant of the embodiment of FIG. 1.

FIGS. 1 and 2, together, depict block diagrams of aspects of interactions among computing devices of two possible variants of a string matching system 1000. Each variant includes one or more of a search device 100 performing bit-parallel string matching with vector registers of a SIMD architecture, and an interacting device 300 that may provide a pattern and/or a sequence for the string matching performed by the search device 100. Each of these computing devices 100 and 300 may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a server, a cluster of servers, a server farm, etc.

As depicted for both variants, these computing devices 100 and 300 may exchange signals conveying data that includes sequences and/or patterns for performance of bit-parallel matching operations and/or data the includes indications of results of such operations. However, one or more of these computing devices may exchange other different and entirely unrelated data. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. It should also be noted that such data may alternatively be exchanged between two more of these computing devices via removable storage (e.g., a solid-state storage based on FLASH memory technology, an optical disc medium, etc.).

In various embodiments of the variant of FIG. 1, the search device 100 incorporates one or more of a processor element 150, a storage 160, controls 120, a display 180 and an interface 190 to couple the search device 100 to the network 999. The storage 160 stores one or more of a control routine 140, a sequence 531, a pattern 532 and a results data 539. In various embodiments of the variant of FIG. 2, the search device 100 additionally incorporates a controller 200 that itself incorporates a processor element 250 and a storage 260. The storage 160 stores the control routine 140, and the storage 260 stores one or more of a control routine 240, the sequence 531, the pattern 532 and the results data 539.

In the variant of FIG. 2, it is envisioned that incorporation of the controller 200 with a processor element 200 and storage 260 that are entirely separate from the processor 150 and the storage 160 may be deemed desirable to provide a second and entirely separate operating environment. Stated differently, the processor element 250 and the storage 260 define portions of an operating environment that is substantially separate from the operating environment defined by at least the processor element 150 and the storage 160. This separate operating environment within the controller 200 enables a bit-parallel string matching algorithm to be executed with a greatly reduced risk of being compromised by other less trustworthy software that may be executed by the processor element 150. This may be deemed important where the bit-parallel matching algorithm is performed by the processor element 250 as part of encryption, verification, or other security functions. The storage of one or more of the sequence 531, the pattern 532 and the results data 539 within the storage 260 aids in further ensuring that none of these are compromised by being altered to defeat a security measure or for some other purpose.

In various embodiments, the interacting device 300 incorporates one or more of a processor element 350, a storage 360, controls 320, a display 380 and an interface 390 to couple the interacting device 300 to the network 999. The storage 360 stores one or more of a control routine 340, the sequence 531, the pattern 532 and the results data 539. The sequence 531 and the pattern 532 may each be at least a portion of any of a variety of types of data, depending on the purpose for which the search device 100 performs a bit-parallel string match. The results data 539 includes an indication of whether the pattern 532 was found within the sequence 531 and/or at what location(s) within the sequence 531.

In embodiments of the variants of both FIGS. 1 and 2 that include the interacting device 300, the interacting device 300 may provide one or both of the sequence 531 and the pattern 532 to the search device 100 as inputs for performing a bit-parallel string match. Alternatively or additionally, the interacting device 300 may receive the results data 539 from the search device 100 following performance of such an operation. Exchanges of these pieces of data 531, 532 and/or 539 may be through the network 999. Such an exchange may result from an operator of the interacting device 300 employing a user interface made up of the controls 320 and the display 380 to indicate a desired search for information such that the pattern 532 may represent a search term specified by that operator. Alternatively, such an exchange may result from an authentication process such that one or the other of the sequence 531 and/or the pattern 532 may each be at least a part of a public or private key, a message to be digitally signed with a key, a digital signature created by signing a message using a key, etc. As those skilled in the art of encryption and digital signature verification will readily recognize, string matching is frequently used in performing such security functions.

Alternatively, and in embodiments of the variants of both FIGS. 1 and 2 that either do or do not include the interacting device 300, the search device 100 may receive one or both of the sequence 531 and the pattern 532 via operation of the controls 120 by an operator of the search device 100. Further, the search device 100 may visually present an indication of the results of a bit-parallel string match on the display 180. Such provision of one or both of the sequence 531 and the pattern 532 and/or such presentation of the results data 539 may arise from an operator of the search device 100 logging into the search device 100 in a procedure that may require provision of a password, fingerprint scan, image capture of a face or other security-related data that becomes one of the sequence 531 or the pattern 532 for a bit-parallel string match.

Turning more specifically to the variant of FIG. 1, in executing the control routine 140, the processor element 150 is caused to perform a bit-parallel string match. In so doing, the processor element 150 employs at least one vector register of the processor element 150 that is divided into lanes, and the vector instruction set of the processor element 150 includes one or more bit-shift instructions in which bits are not carried over between adjacent lanes. The control routine 140 incorporates instructions, that when executed by the processor element 150, causes the processor element 150 to overcome this lack of bit carry, as will be explained in greater detail.

Turning more specifically to the variant of FIG. 2, in executing the control routine 140, the processor element 150 may provide support for the processor element 250 performing a bit-parallel string matching operation, rather than the processor element 150 doing so. Thus, it is the processor element 250 that is caused by execution of the control routine 240 to perform a bit-parallel string match using a vector register of the processor element 250 that is divided into lanes, and in which the vector instruction set of the processor element 250 includes one or more bit-shift instructions in which bits are not carried over between adjacent lanes. Thus, in this variant, it is the control routine 240 that incorporates instructions, that when executed by the processor element 250, causes the processor element 250 to overcome this lack of bit carry. This variant may be employed where bit-parallel string matches are performed as part of encryption verification, and/or other security-related purposes.

In various embodiments, each of the processor elements 150, 250 and 350 may include any of a wide variety of commercially available processors, including without limitation, an AMD® Athlon®, Duron® or Opteron® processor; an AMD Radeon™ graphics processor; an Analog Devices® Sharc® or TigerSharc™ digital signal processor; an ARM® application, embedded or secure processor; an IBM® and/or Motorola® DragonBall® or PowerPC® processor; an IBM and/or Sony® Cell processor; a Nvidia® GeForce®, Quadro®, Tesla™, Ion™ or PureVideo™ graphics processor; a Texas Instruments® DaVinci™ digital signal video processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, each of the storages 160, 260, and 360 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190 and 390 may employ any of a wide variety of signaling technologies enabling corresponding ones of the computing devices 100 and 300 to be coupled through the network 999 as has been described. Each of these interfaces includes circuitry providing at least some of the requisite functionality to enable such coupling. However, this interface may also be at least partially implemented with sequences of instructions executed by corresponding ones of the processor elements 150, 250 and 350 (e.g., to implement a protocol stack or other features). Where one or more portions of the network 999 employs electrically and/or optically conductive cabling, the interface 190 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, the interface 190 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HS-DPA), High Speed Uplink Packet Access (HSUPA), 4G LTE, etc. It should be noted that although each of the interfaces 190 and 390 are depicted as a single block, one or more of these may include multiple interfaces that may be based on differing signaling technologies. This may be the case especially where one or more of these interfaces couples corresponding ones of the computing devices 100 and 300 to more than one network, each employing differing communications technologies.

As previously discussed, there are a number of types of bit-parallel string matching algorithms that have been devised in recent years, including Shift-Or, Shift-And and BNDM (backward nondeterministic DAWG matching, in which DAWG is an acronym for direct acyclic word graph, and in which "nondeterministic" refers to the BNDM's use of a nondeterministic finite automaton or "NFA"). Different string matching algorithms have been found to be relatively efficient for different combinations of sequences and patterns having different lengths and characteristics, and BNDM has been found to be efficient over a relatively wide range of these.

FIGS. 3 and 4a through 4c, together, depict some limited aspects of BNDM at a conceptual level. It should be noted that despite this depiction of details of a specific bit-parallel string matching algorithm is provided only to aid in illustrating how the bit-shifting techniques discussed herein may be applied to enable an improvement in performance of bit-parallel string matching algorithms, such as BNDM. Thus, this depiction of aspects of BNDM should not be taken as limiting the use of the bit-shifting techniques discussed herein solely to BNDM or to any other specific bit-parallel string matching algorithm.

Turning to FIG. 3, in BNDM, the elements making up the sequence 531 are read through a "window" 511 that is the same size in elements as the pattern 532, and then compared to all elements in the pattern 532 to locate matching elements. Usually, the window 511 is moved along the sequence 531 in a direction often regarded or at least described as "forward" along the sequence 531. However, within the window 511, the reading of elements from the sequence 531 to use in searching the pattern 532 for matching elements is done starting from the rearmost one of those elements within the window 511 and going towards the forwardmost one of those elements in a direction often regarded or at least described as "backward" within the window 511.

It should be noted that in the English language, as well as various other languages in which words and sentences are generally read left-to-right, moving left-to-right is generally regarded as moving in the "forward" direction, while moving right-to-left is generally regarded as moving in the "backward" direction. As there are other languages in which this is not the case (including languages in which words and sentences are read vertically and/or right-to-left), it should be noted that depictions and discussions herein of moving forward and rightward as being one in the same, as well as moving backward and moving leftward as being one in the same should not be taken as limiting what is discussed and depicted herein to any particular directions. Thus, such discussion and depiction of particular directions herein should not be taken as being so limiting of the manner in which the techniques discussed herein may be applied.

Figure 4A:
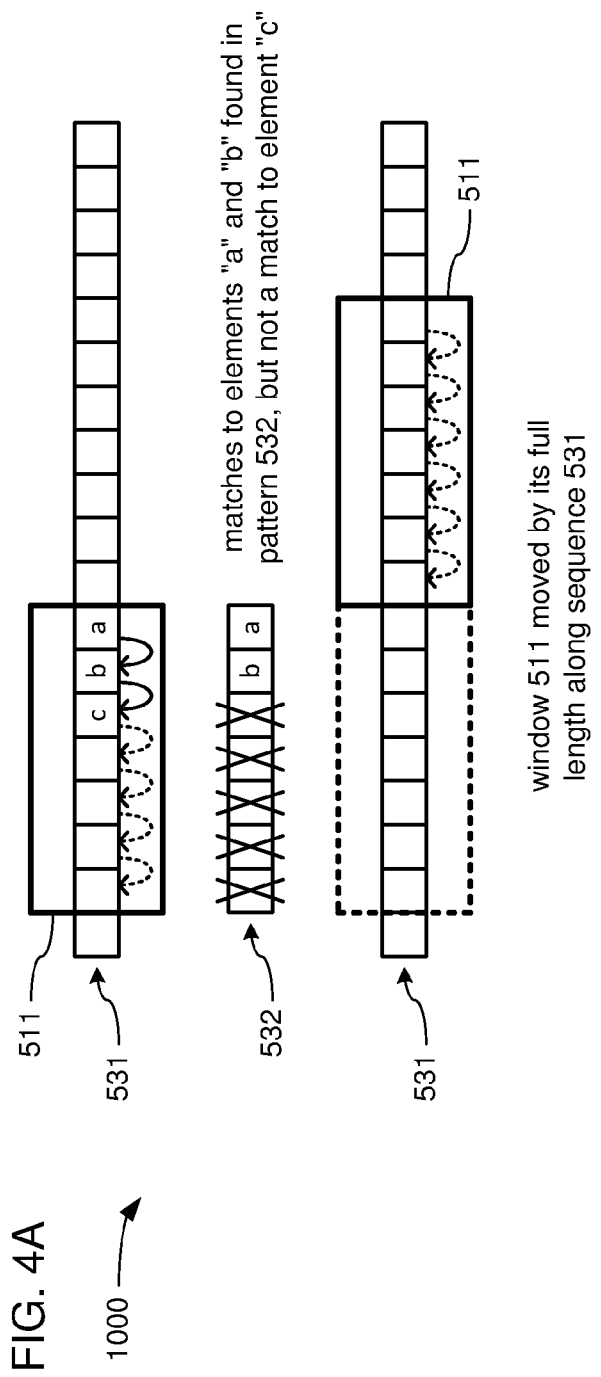
Figure 4B:
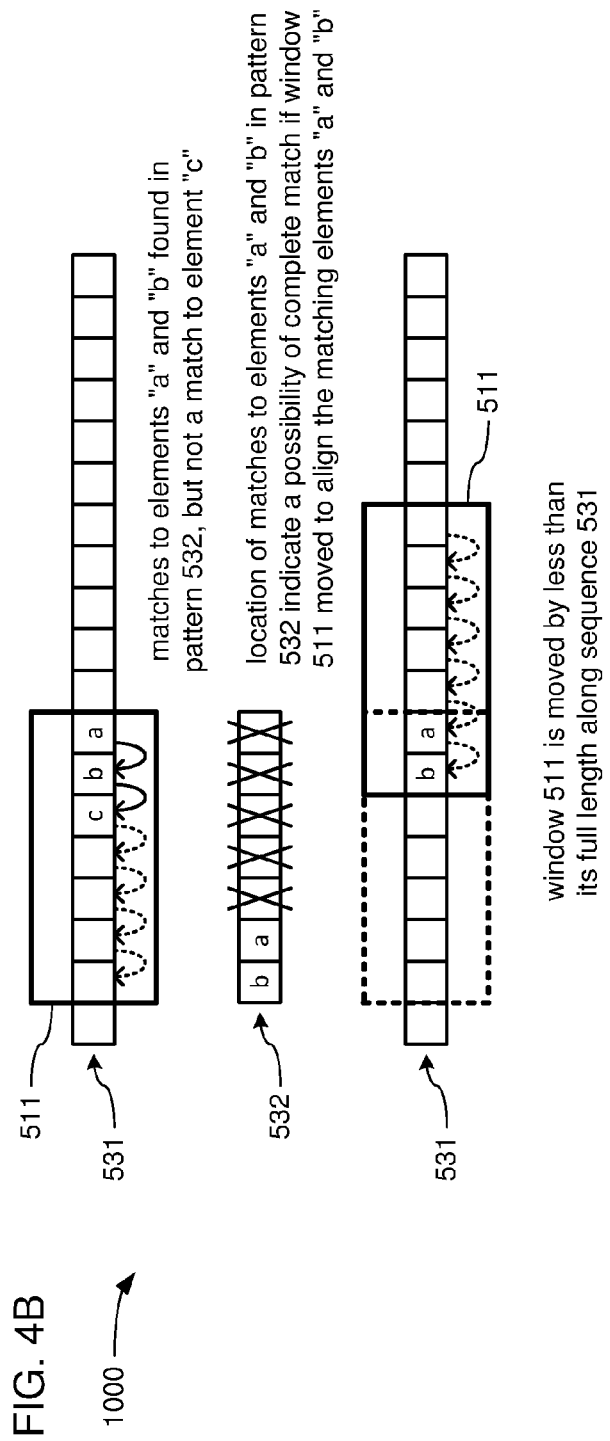

FIGS. 4a-c present three possible scenarios of movement of the window 511 along the sequence 531, and of reading of elements within the window 511 in a specific order. It should be noted that in presenting these three scenarios, no attempt is being made herein to set forth a description of the BNDM algorithm or of any other bit-parallel string matching algorithm. Describing a bit-parallel string matching algorithm or any other form of string matching algorithm is entirely beyond the scope of this disclosure.

In FIGS. 4a-c, the presumption is made that the "forward" direction in which the window 511 is moved along the length of the sequence 531 is left-to-right, and that the "backward" direction in which elements of the sequence 531 within the window 511 are read for comparison to elements of the pattern 532 is right-to-left. Letters of the English alphabet are presented in alphabetical order from the letter "a" onward through the letter "g" within the window 511 in each of FIGS. 4a-c as aid to making clear the order in which the elements of the sequence 531 within the window 511 are read—starting with "a" at the rearmost end (rightmost position) of the window 511 and proceeding, one element at a time (i.e., following alphabetical order for the English language), towards "g" at the forwardmost end (leftmost position) of the window 511. Despite this depiction of letters "a" through "g" in alphabetical order as a guide to order of reading within the window 511, it should be again noted that the elements making up the sequence 531 and the pattern 532 may be any type of data, including but not limited to, DNA sequences, text, numerical data, etc.

FIG. 4a presents a scenario in which the window 511 is moved forwardly (rightward) along the sequence 531 by a number of elements equal to its length as counted in elements as a result of an incomplete match between elements of the sequence 531 within the window 511 and elements of the pattern 532. More precisely, starting with the element "a" in the rearmost end (rightmost position) of the window 511, a match to the element "a" was found in the pattern 532. Then, moving backwards (right-to-left) along the sequence 531 within the window 511, the element "b" was also found to have a match in the pattern 532. However, moving backwards again along the sequence 531 to the element "c" reveals that there is no match for the element "c" anywhere within the pattern 532 (as indicated by the cross-outs over five of the element positions of the pattern 532). With "a" and "b" found within the pattern 532, but not "c", further reading of elements from within the window 511 for comparison to elements within the pattern 532 is deemed unnecessary as it is now clear that there cannot possibly be a complete match between the elements within the window 511 and the pattern 532 (thus, it does not matter what the other elements within the pattern 532 may be).

FIG. 4b presents a scenario in which the window 511 is moved forwardly (rightward) along the sequence 531 by a number of elements less than its length as counted in elements. Like the scenario depicted in FIG. 4a, an incomplete match of the elements "a" and "b" is found where again there is no match found for the element "c" within the pattern 532 (again indicated by the cross-outs over five of the element positions of the pattern 532) such that further reading of the elements of the window 511 is deemed unnecessary. However, unlike the scenario of FIG. 4a, the incomplete match of FIG. 4b includes the matching elements "a" and "b" at the forwardmost end (leftmost two positions) of the pattern 532, and with these elements "a" and "b" in a matching order to their counterparts within the window 511. As a result, unlike the scenario of FIG. 4a, the possibility is presented in the scenario of FIG. 4b of a complete match being found if the window 511 is moved forwardly by five elements along the sequence 531, instead of by its full length as measured in elements.

FIG. 4c presents a scenario in which the window 511 is moved forwardly (rightward) along the sequence 531 by a number of elements equal to its length as counted in elements as a result of a complete match being found between the elements of the sequence 531 within the window 511 and the elements of the pattern 532. Again starting at the rearmost end (rightmost position) of the window 511, and moving backwards (leftward) along the sequence 531 within the window 511, the elements "a", then "b", then "c", then "d", then "e", then "f" and then "g" are read and are found to all be present and in that same order (also going backwards) within the pattern 532. The fact of finding this one complete match is recorded (as well as its location along the length of the sequence 531) as part of the results data 539. Then, the window 511 is moved forward (rightward) along the sequence 531 by a number of elements equal to the size of the window 511 in elements as part of searching for another instance of such a match.

Figure 5A:
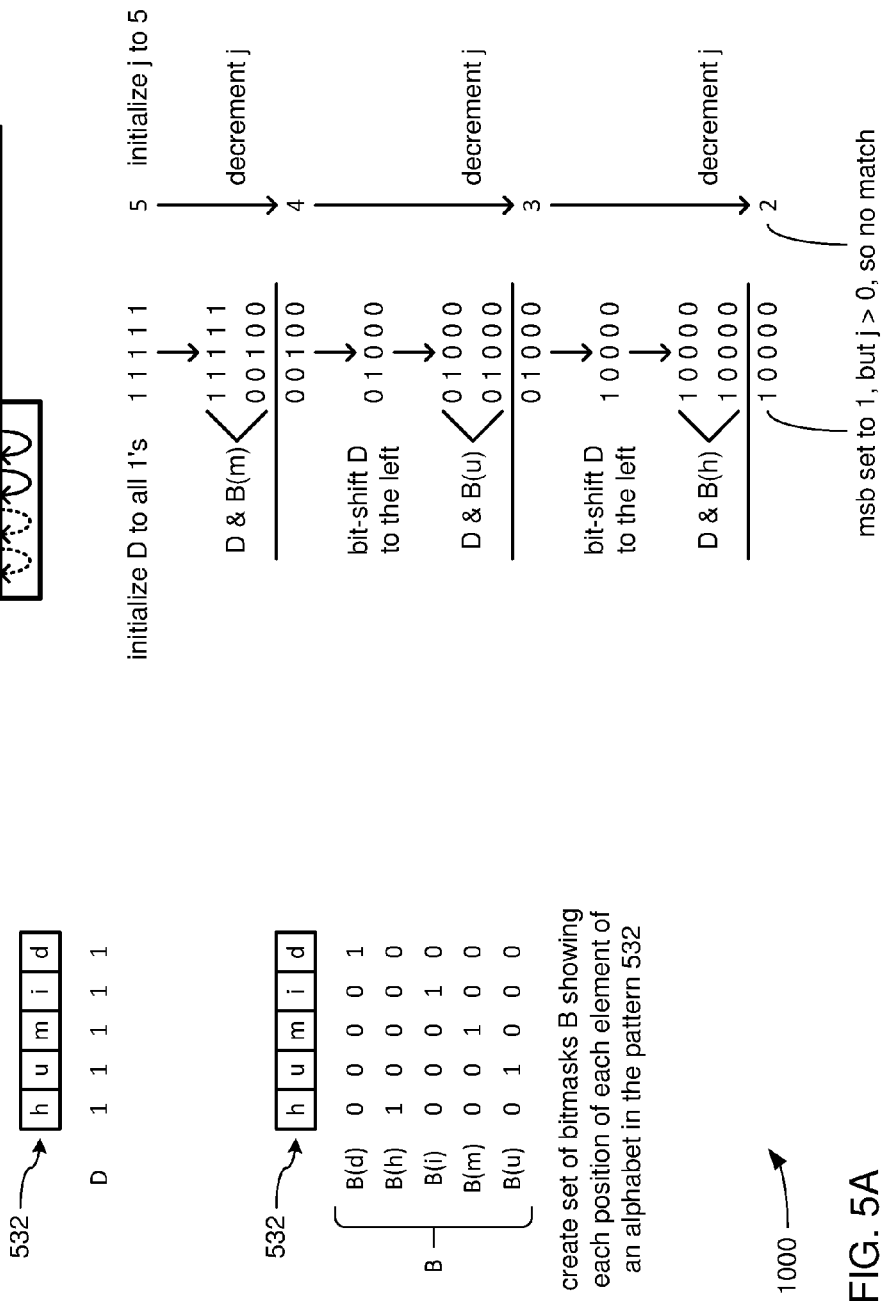
FIGS. 5A-B illustrate aspects of a bitwise implementation of string matching in the embodiment of FIG. 1.
Figure 5B:
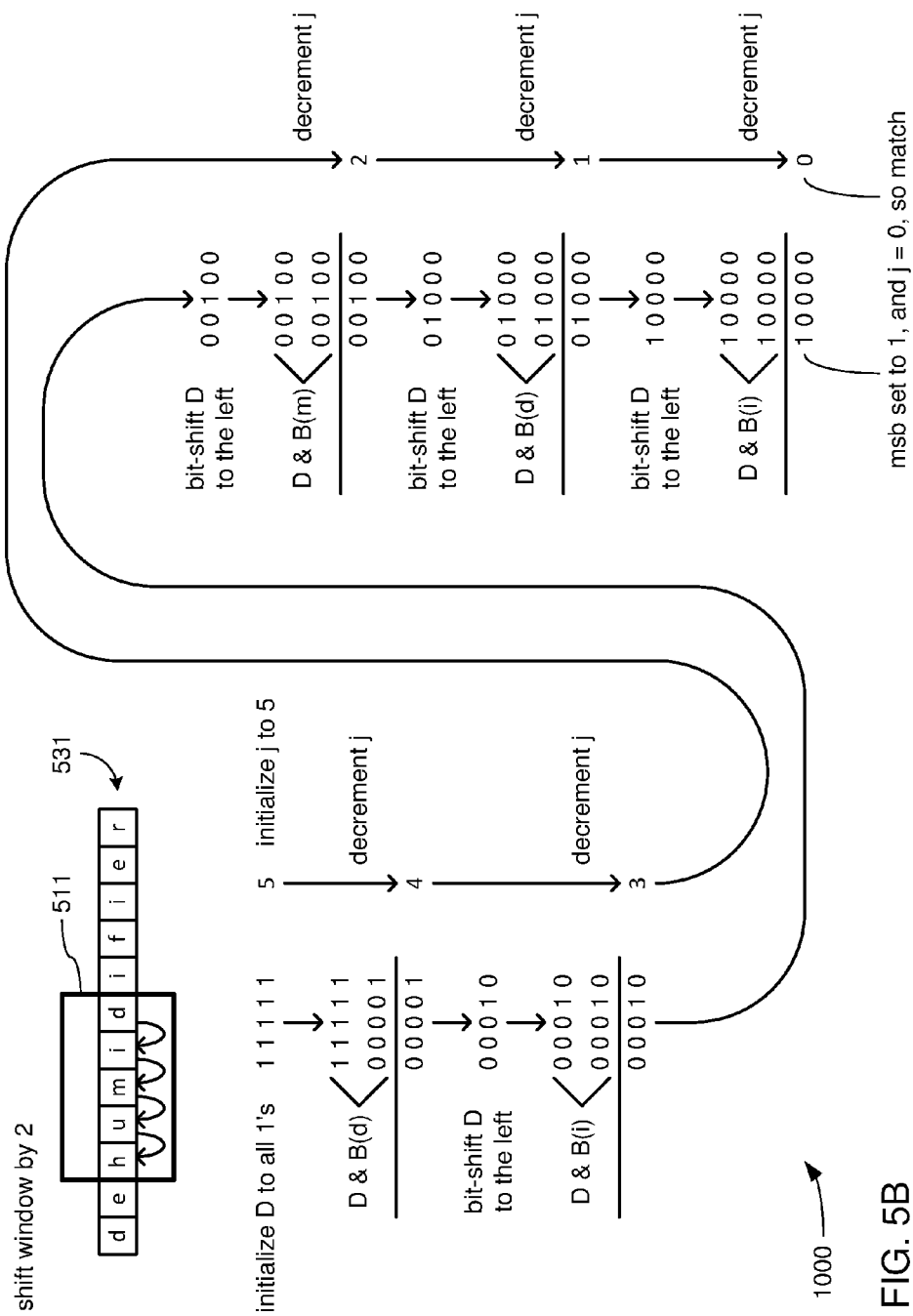

FIGS. 5a and 5b, together, exemplify use of bit-shifting in an example implementation of bitwise operations of BNDM, where the pattern 532 is a text string "humid" and the sequence 531 is a text string "dehumidifier" that is searched for all instances of "humid" therein. For sake of brevity, only a portion of the performance of this search for instances of "humid" is depicted in order to more clearly show use of bit-shifting.

Starting with FIG. 5a, in BNDM and other bit-parallel string matching algorithms, a test bitmask "D" having a bit length equal to the number of elements in the pattern 532 is instantiated. The test bitmask D is repeatedly initialized to all 1's and used in tests for matches at various locations along the length of the sequence 531 where the test bitmask D is repeatedly bitwise ANDed or ORed (depending on the algorithm) to other bitmasks of the same length. Further, between numerous ones of these tests for matches, the test bitmask D is bit-shifted. As will be explained in greater detail, it is the bit-shifting of the test bitmask D that is potentially subject to difficulty where the test bitmask D is instantiated within a vector register of a processor employing a SIMD architecture.

In BNDM, a set of additional bitmasks B that each have a bit length equal to the number of elements in the pattern 532 is also instantiated. At least one each of these bitmasks B is instantiated for every element of an alphabet of the elements that exists within the pattern 532. Therefore, given that the text string "humid" is made up of five elements, none of which are repeated, there are at least five bitmasks in the set of bitmasks B. These bitmasks B are indexed by their respective elements, such that for the text string "humid" the set of bitmasks B include the bitmasks B(d), B(h), B(i), B(m) and B(u). Within each of these bitmasks B, the bits are set to 0 or 1 in a manner indicative of where their respective elements appear in the pattern 532.

As previously discussed, searching for instances of the pattern 532 within the sequence 531 commences with the window 511 positioned at the start of the sequence 531. Thus as depicted, the window 511 is positioned over "dehum" at the forwardmost (leftmost) end of the sequence 531. As also previously discussed, elements of the sequence 531 are read, one at a time, to attempt to find matching elements within the pattern 532 starting at the rearmost end (rightmost position) of the window 511, and progressing backwards towards the forwardmost end (leftmost position) of the window 511. Thus as depicted, the first element read is "m" at the rearmost end of the window 511.

To test for at least one instance of "m" within the pattern 532, the test bitmask D is initialized to all 1's and a countdown index j is initialized to 5. The bitmask B(m) is retrieved and its bits are ANDed to the test bitmask D such that D=D&B(m). Also, the index j is decremented by 1 to reflect the occurrence of this test. The result of this AND operation (bitwise logical conjunction operation) leaves the test bitmask D with a nonzero bit value (specifically, 00100) indicating that at least one instance of the element "m" is present in the pattern 532. In response, the search for more matches of elements between those within the window 511 at its current location and the pattern 532 continues, and the next element "u" is read from within the window 511.

To test for at least one instance of "u" within the pattern 532 following the successful locating of at least one instance of "m" in the pattern 532, the test bitmask D is bit-shifted to the left by one bit position. Then, the bitmask B(u) is retrieved and its bits are ANDed to the test bitmask D such that D=D&B(u). Also, the index j is again decremented by 1 to reflect the occurrence of this test. The result of this AND operation (bitwise logical conjunction operation) again leaves the test bitmask D with a nonzero bit value (specifically, 01000) indicating that at least one instance of the element "u" is present in the pattern 532. In response, the search for more matches of elements between those within the window 511 at its current location and the pattern 532 continues, and the next element "h" is read from within the window 511.

To test for at least one instance of "h" within the pattern 532 following the successful locating of instances of "m" and "u" in the pattern 532, the test bitmask D is again bit-shifted to the left by one bit position. Then, the bitmask B(h) is retrieved and its bits are ANDed to the test bitmask D such that D=D&B(h). Also, the index j is yet again decremented by 1 to reflect the occurrence of this test. The result of this AND operation (bitwise logical conjunction operation) yet again leaves the test bitmask D with a nonzero bit value (specifically, 10000) indicating that at least one instance of the element "h" is present in the pattern 532. Also, the fact of the most significant bit (MSB) of the test bitmask D now being set to 1 indicates the end of testing with the window 511 in its current position. Had all of the elements within the window 511 been tested such that j was decremented down to 0, then the setting of the MSB of the test bitmask D to 1 would indicate that a match had been found. However, in this instance, j has been decremented only down to 2, and therefore, there is no match.

Turning to FIG. 5b, in response to this lack of a match, the window 511 is moved forward (rightward) along the sequence 532, but not for a number of elements equal to its size as counted in elements. The value of 2 for the index j reflects the results of the preceding tests that indicate that 3 of the 5 elements read from the sequence 531 within the window 511 did have matches in the pattern 532, and therefore, there is a possibility that a match of the full pattern 532 might be found if the window 511 is moved only by the number of elements indicated by the non-zero value of j. Thus, the window 511 is moved by only two elements in a manner similar to what was depicted in FIG. 4b.

With the window 511 having been moved, the test bitmask D is again initialized to all 1's, the index j is again initialized to 5, and the elements of the sequence 531 are again retrieved from within the window 511 starting at the rearmost (rightmost) end thereof. As illustrated in FIG. 5b, the text string "humid" is, this time, within the window 511, and thus, a match with the text string "humid" of the pattern 532 will be found. In identifying this match, the test bitmask D is subjected to five AND operations with the bitmasks B(d), B(i), B(m), B(u) and B(h) (in that order), resulting in non-zero values of the test bitmask D after each ANDing. Also, between these five AND operations, the test bitmask D is bit-shifted four times. With these five AND operations, the index j is decremented all the way from 5 down to 0, indicating that all elements within the window 511 have been read and employed in such testing. Thus, when the MSB of the test bitmask D is set to 1 at the end of the five AND operations, the index j having the value of 0 indicates that a match has been found.

In response to finding this match, the window 511 is again moved, and the search for more matches is performed in a manner similar to what was depicted in FIG. 4c. In the interests of brevity, such a further performance is not illustrated. However, among what is illustrated in FIGS. 5a-b is a demonstration to the effect that the bit-shifting of the test bitmask D occurs frequently in such bit-parallel string matching algorithms, as does the initialization of the test bitmask D to all 1's. Therefore, such bit-shifting of the test bitmask D is a significant portion of the performance of such algorithms.

FIGS. 6a through 6e, together, illustrate aspects of another example of use of bit-shifting in BNDM, where the pattern 532 is a text string "because of you" and the test bitmask D is instantiated within a vector register 551 divided into lanes 552a through 552d. It should be noted that FIGS. 6a-d depict an example set of vector registers deliberately illustrated as only 32 bits in width and subdivided into four lanes of only 8 bits in width for the sake simply of enabling these figures to fit properly on a page. In actual practice, it is envisioned that the techniques discussed herein would be applied to vector registers of 128, 256, 512 or more bits in width, with lanes that are each 16, 32, or 64 or possibly more bits in width. Therefore, the depicted limited widths of vector registers and lanes herein should not be taken as limiting the application of the techniques described herein to such small bit widths.

It should be noted that repeated use is made of AND and OR operations between bitmasks, including bitmasks in various registers. To be clear, these AND and OR operations are bitwise logical operations in which bits in corresponding bit positions in two bitmask operands serving as inputs are logically ANDed or ORed together, with the results either remaining within one of the two registers that provided the two bitmasks used as operand inputs or being deposited within a third register. Thus, each such AND operation is a bitwise logical conjunction operation in which the two operand input bitmasks may be described as "ANDed" together or "combined in a bitwise logical conjunction operation." Also, each such OR operation is a bitwise logical disjunction operation in which the two operand input bitmasks may be described as "ORed" together or "combined in a bitwise logical disjunction operation."

Turning to FIG. 6a, an example of an efficient approach to initializing the test bitmask D within the vector register 551 using SIMD features is illustrated. A vector mask 553 is set to indicate which lanes 552a through 552d of the vector register 551 are to be filled with all 1's. Such vector masks are a common feature in SIMD architectures as a way to control which lanes of a vector register are to be included in a particular bitwise, arithmetic or other operation. In this situation, the number of elements within the pattern 532 ("because of you") is 14, and from this, it is calculated that only the two lanes 552a and 552b are needed to hold the corresponding 14-bit length of the test bitmask D. Thus, the vector bitmask 553 is set to 0011 to cause the filling of lanes with all 1's to be limited to the lanes 552a-b. These two lanes of the vector register 551 are then filled with all 1's. It is also calculated that the 14-bit length of the test bitmask D occupies all but the two most significant bits of the lane 552b (i.e., all bit positions of the lane 552b, except the bit positions 7 and 6). In response, the vector mask 553 is set to limit the use of a rightward bit-shift operation on the vector register 551 to the lane 552b. The lane 552b of the vector register 551 is then bit-shifted to the right twice, resulting in 0's filling in the bit positions 7 and 6 in the lane 552b of the vector register 551.

Though not specifically shown, this initialized state of the vector register 551 (with the 14-bit length of the test bitmask D initialized to all 1's and all other bits of the vector register 551 initialized to 0) may be copied to another vector register. This same initialized state of the test bitmask D may then be copied back from that other vector register into the vector register 551 whenever the test bitmask D is to be re-initialized to this same state as a time-saving and power-saving alternative to repeating the initialization technique just described and depicted in FIG. 6a.

Figure 6B:
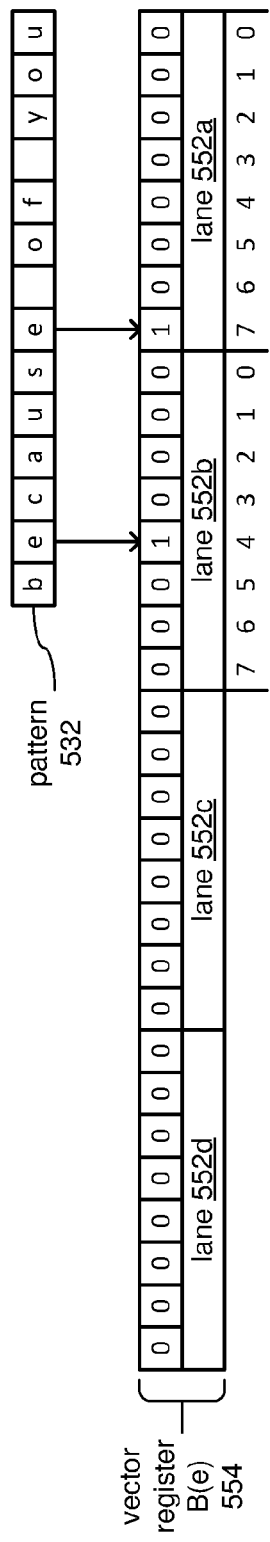

FIG. 6b depicts an example of a bitmask B(e) of the set of bitmasks B created to indicate locations of the element "e" within the pattern 532. As depicted, the bitmask B(e) is instantiated within another of the vector registers 554. Depending on the number of different elements within the pattern 532 versus the number of vector registers within a given processor, it may be possible in various embodiments to instantiate every bitmask B within a vector register.

Figure 6D:
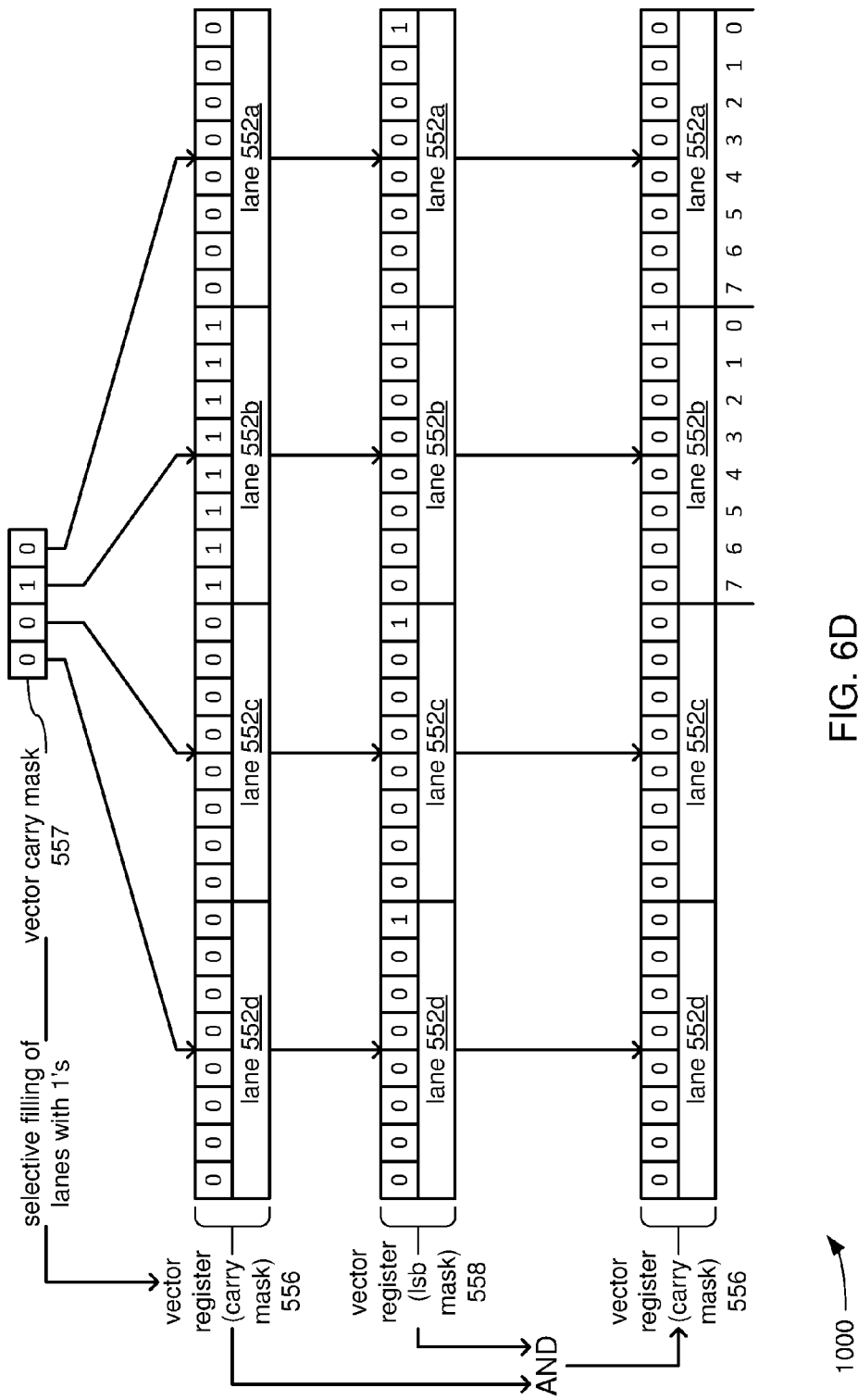
Figure 6E:
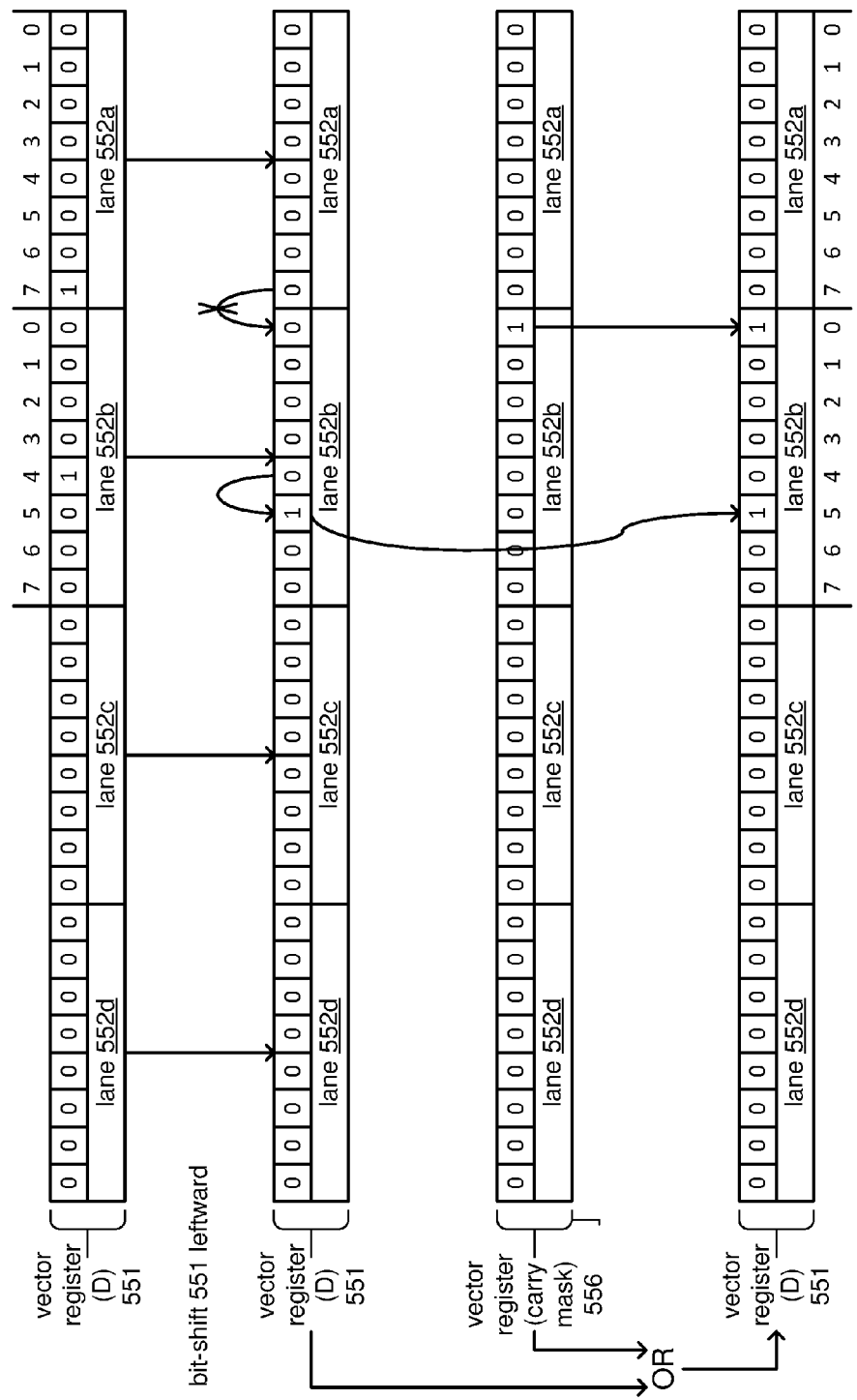

FIGS. 6c-e depict an approach to bit-shifting the test bitmask D within the vector register 551 by one bit to the left. FIG. 6c shows the state of the test bitmask D within the vector register 551 after having been ANDed to the bitmask B(e) within the vector register 554. Specifically, the test bitmask D is shown as having a bit value identical to that to which the bitmask B(e) was initialized within the vector register 554 (FIG. 6b).

As has been previously discussed, in some SIMD architectures, bit-shift operations result in bit values at the MSB and/or LSB position within one lane of a vector register simply being dropped instead of carried over to an adjacent lane of that vector register. Presuming that the vector register 551 is of an implementation of SIMD that suffers this limitation, then a bit-shift of the vector register 551 to the left would result in the 1 at the MSB position (bit position 7) of the lane 552a not being carried over into the LSB bit position (bit position 0) of the lane 552b.

To resolve this, the vector register 551 is ANDed with another vector register 555 serving as a MSB mask in which only the MSB bits in each of its lanes 552a-d are set to 1, and the result of this AND operation (bitwise logical conjunction operation) is stored still another vector register 556 serving as a carry mask. The result of this AND operation (bitwise logical conjunction operation) is a non-zero value in the lane 552a and zero values in the other lanes 552b-d of the vector register 556. A 4-bit vector carry mask 557 is created from this combination of zero and non-zero values in the lanes 552a-d of the vector register 556 indicating the zero or non-zero state of each of those lanes within its four bits. This 4-bit vector value of the vector carry mask 557 is then converted to a scalar value to enable a leftward bit-shift among its four bits, and then converted back to a 4-bit vector value.

Turning to FIG. 6d, the vector carry mask 557 as a per-lane control of which of the lanes 552a-d of the vector register 556 is filled with 1's. The vector register 556 is then ANDed with still another vector register 558 serving as a LSB mask in which only the LSB bits in each of its lanes 552a-d are set to 1, and the result of this AND operation (bitwise logical conjunction operation) is stored back into the vector register 556.

As a result, the vector register 556 now serves as a carry mask, carrying over the bit value 1 from the MSB bit position of the lane 552a of the vector register 551.

Turning to FIG. 6e, with that bit carried, the vector register 551 holding the test bitmask D is shifted to the left by one bit position. As expected, while the bit value of 1 in the bit position 4 of the lane 552b is successfully shifted to the bit position 5 within the same lane, the bit value of 1 in the bit position 7 (the MSB bit position) of the lane 552a is not carried over to the bit position 0 (the LSB bit position) of the lane 552b such that it is lost. However, the vector register 551 is then ORed with the vector register 556 serving as the carry mask for that otherwise lost bit value, and the result of this OR operation (bitwise logical disjunction operation) is stored back into the vector register 551, thereby filling the bit position 0 (the LSB bit position) of the lane 552b of the vector register 551 with that otherwise lost bit value.

It should be noted that although FIGS. 6c-e and their accompanying description specifically set forth aspects of techniques for overcoming the lack of carry of bit values from MSB bit positions to LSB bit positions in adjacent lanes to the left in a leftward bit-shift operation of a vector register, the same techniques may be used for overcoming the lack of carry of bit values from LSB bit positions to MSB bits in adjacent lanes to the right in a rightward bit-shift operation of a vector register. Such a rightward bit-shift of a vector register with such a lack of bit carry between lanes may be encountered in implementing the shift-OR bit-parallel string matching algorithm. In such an alternate, rightward bit-shift situation, much of what is depicted in FIGS. 6c-e would be unchanged except that the vector value within the vector carry mask 557 would be bit-shifted to the right while converted to a scalar value in FIG. 6c, and the vector register 551 would be bit-shifted to the right in FIG. 6e.

Figure 7:
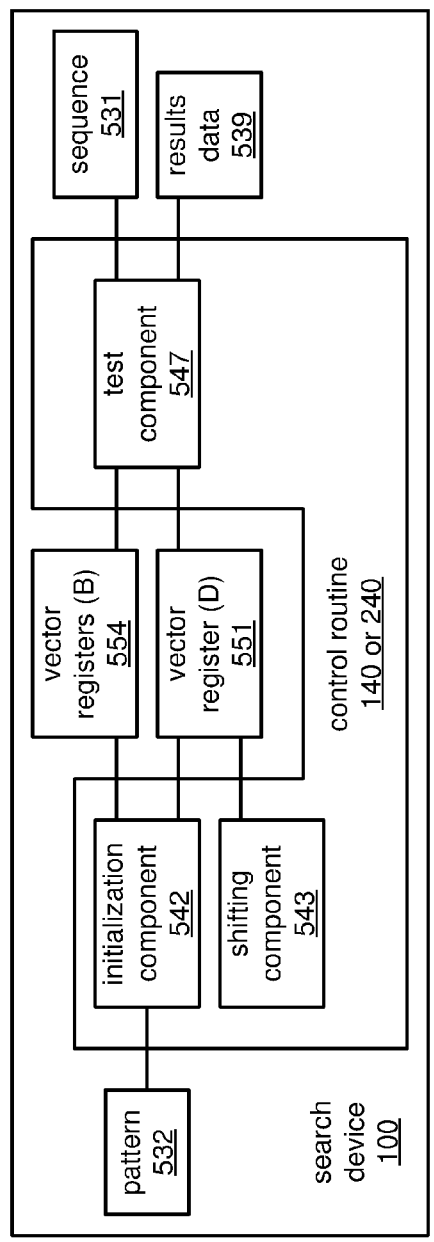
FIG. 7 illustrates a block diagram of a portion of the embodiment of FIG. 1.

FIG. 7 illustrates a block diagram of a portion of the block diagrams of either of the variants of FIG. 1 or 2 in greater detail. More specifically, aspects of the operating environment in which bit-parallel string matching is performed in either of the variants of the computing device 100 in FIG. 1 or 2 are depicted, in which corresponding ones of the processor element 150 or 250 are caused by execution of the control routine 140 or 240 to perform the aforedescribed functions. As will be recognized by those skilled in the art, each of these control routines, including the components of which each is composed, are selected to be operative on whatever type of processor or processors that are selected to implement corresponding ones of these processor elements.

In various embodiments, each of the control routines 140 and 240 may include a combination of an operating system, device drivers and/or application-level routines (e.g., so-called "software suites" provided on disc media, "applets" obtained from a remote server, etc.). Where an operating system is included, the operating system may be any of a variety of available operating systems, including without limitation, Windows™, OS X™, Linux®, or Android OS™. Where one or more device drivers are included, those device drivers may provide support for any of a variety of other components, whether hardware or software components, of corresponding ones of the computing device 100 and the controller 200.

Depending on which of the processor elements 150 or 250 are caused to perform bit-parallel string matching as described herein, one or the other of the control routines 140 and 240 includes an initialization component 542 executable by the corresponding one of the processor elements 150 or 250 to instantiate and initialize the test bitmask D and the each of the bitmasks of the set of bitmasks B. As has been described, the test bitmask D and all of the bitmasks B are instantiated with bit lengths equal to the number of elements within the pattern 532. The initialization component fills each of the bitmasks B with bit values indicative of the location(s) of their associated elements within the pattern 532. The initialization component 542 also recurringly prepares the test bitmask D for use in tests of matches between elements within the window 511 and the pattern 532 by filling the bits of the test bitmask D with 1's. In so doing, the initialization component 542 may employ SIMD features to selectively fill lanes of a vector register within which the test bitmask D is instantiated with 1's followed by selectively bit-shifting most significant of those lanes as has been described to achieve a sequence of 1's of the intended length of the test bitmask D. The initialization component 542 may initialize that vector register in this manner, just once, and then copy its initialized state to another vector register for later use in re-initialization by simply copying this initialized state back from that other vector register.

One or the other of the control routines 140 and 240 also includes a shifting component 543 executable by the corresponding one of the processor elements 150 or 250 to effect bit-shifting of the test bitmask D within a first vector register 551 of the corresponding one of these processor elements. As has been described, the bit values at the MSB bit positions are stored in a second vector register 556 serving as a carry mask (through an AND operation with a MSB mask), and a vector carry mask 557 is formed indicating zero and non-zero values in the lanes of the second vector register. The vector value of the vector carry mask 557 is then converted into a scalar value, is bit-shifted, and is then converted back into a vector value. The vector carry mask 557 is then used to select which lanes of the second vector register 556 are filled with 1's, and then ANDed with a LSB mask such that the second vector register 556 is left with 1's only at LSB bit positions in the lanes that were filed with 1's. The first vector register 551 is bit-shifted, with the expected loss of bits occurring wherever a bit carry would have otherwise occurred without the SIMD limitations, and the first and second vector registers 551 and 556 are ORed such that the otherwise missing carry bits are added to the first vector register 551 following its bit-shift and the test bitmask D is intact as it should be.

One or the other of the control routines 140 and 240 further includes a test component 547 executable by the corresponding one of the processor elements 150 or 250 to direct the occurrences of initializations and bit-shifting of the test bitmask D. The test component 547 also performs the shifting of the window 511 along the sequence 531, and the storage of indications of any matches that are found in the results data 539.

Figure 8:
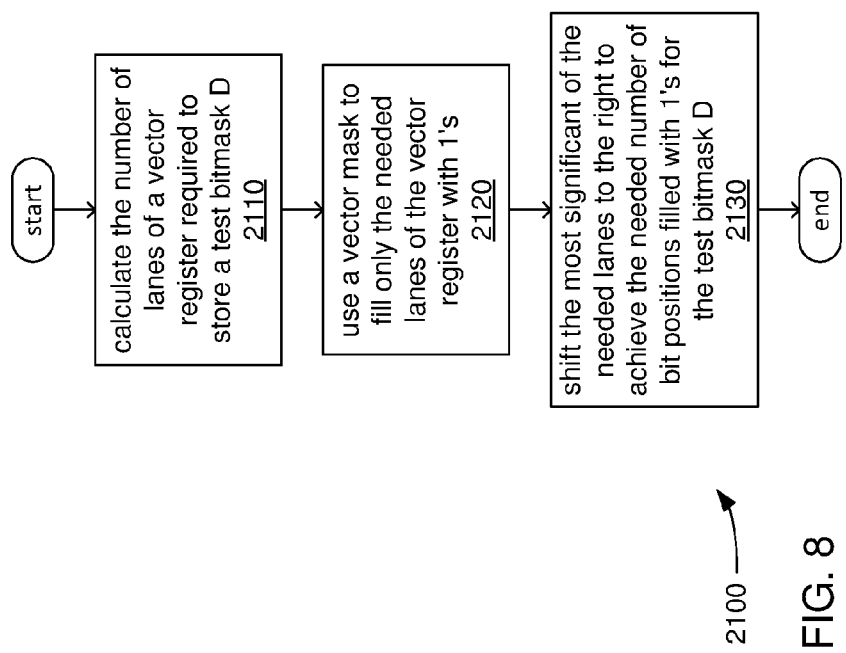
FIG. 8 illustrates an embodiment of a first logic flow.

FIG. 8 illustrates one embodiment of a logic flow 2100. The logic flow 2100 may be representative of some or all of the operations executed by one or more embodiments described herein. More specifically, the logic flow 2100 may illustrate operations performed by one of the processor elements 150 or 250 of the search device 100 in executing at least a corresponding one of the control routines 140 or 240.

At 2110, a computing device (e.g., the search device 100) instantiates a test bitmask D within a vector register of the processor element of the computing device by first calculating the number of lanes of that vector register that is required to store the test bitmask D. As has been explained, various different bit-parallel string matching algorithms make use of a test bitmask (conventionally designated "D") in performing bitwise operations to test for matches between elements of a pattern (e.g., the pattern 532) and the portion of a sequence (e.g., the sequence 531) within a shifting window (e.g., the window 511).

At 2120, the computing device uses a vector mask to selectively fill only the ones of the lanes of the vector register where any of the bits of the test bitmask D are stored. As has been discussed, this filling of these lanes is typically with all 1's. However, it should be noted that other embodiments are possible in which the filling of these lanes entails clearing them with all 0's.

At 2130, the computing device bit-shifts the most significant one of the lanes in which any bits of the test bitmask D are stored to the right to adjust the overall number of bit positions that have been filled to match the number of bit positions making up the test bitmask D. As has been discussed, such selective shifting of a particular lane may be accomplished by again using a vector bitmask.

Figure 9:
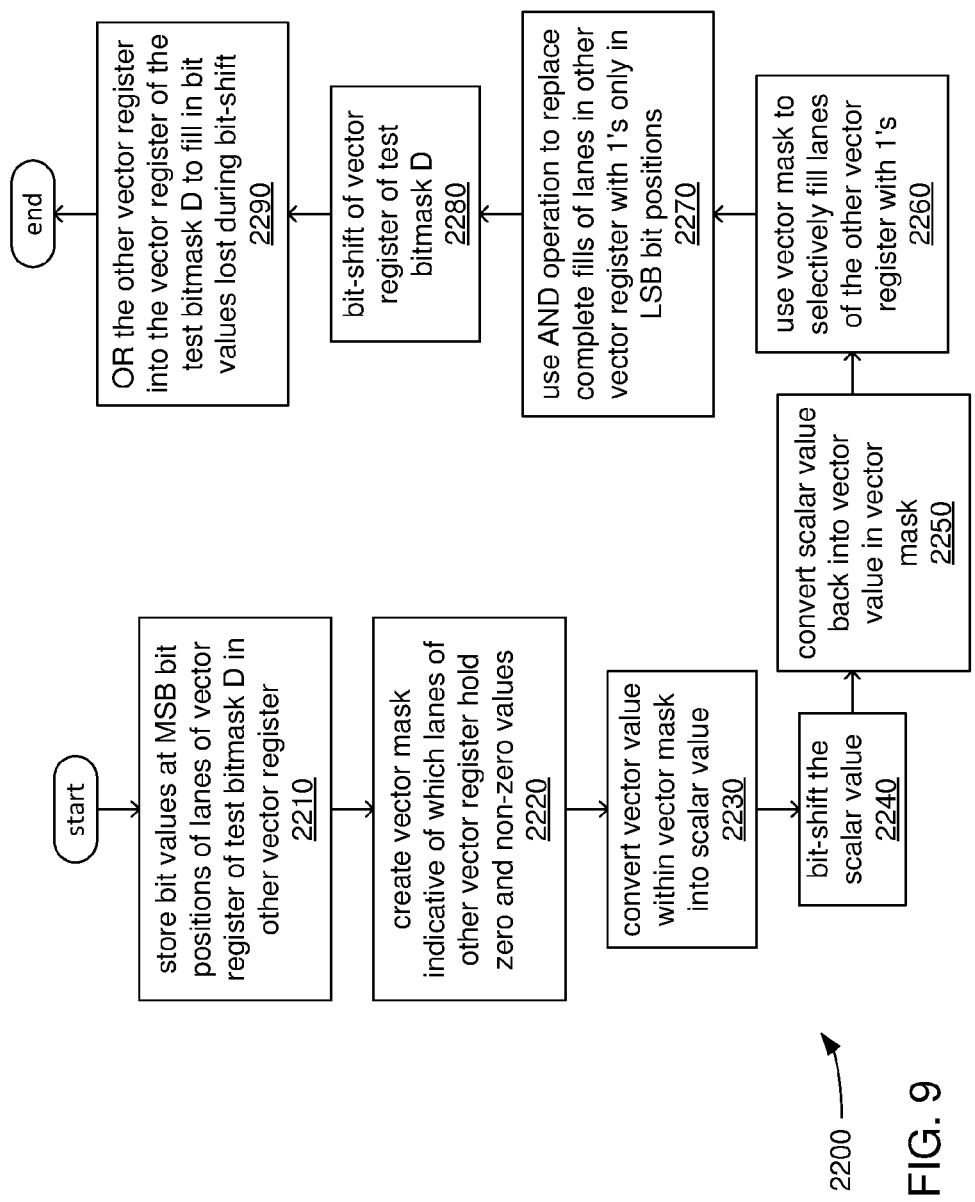
FIG. 9 illustrates an embodiment of a second logic flow.

FIG. 9 illustrates one embodiment of a logic flow 2200. The logic flow 2200 may be representative of some or all of the operations executed by one or more embodiments described herein. More specifically, the logic flow 2200 may illustrate operations performed by one of the processor elements 150 or 250 of the search device 100 in executing at least a corresponding one of the control routines 140 or 240.

At 2210, a computing device (e.g., the search device 100) stores copies of the bit values at the MSB bit locations of each lane of a vector register storing a test bitmask D within another vector register, both registers being part of a processor element implementing a SIMD architecture. As has been described, this is done through an AND operation (bitwise logical conjunction operation) in which a MSB mask in still another vector register is used to effectively filter through only the MSB bits of the lanes of the vector register storing the test bitmask D.

At 2220, the computing device creates a vector mask indicative of which lanes of that other vector register hold zero and non-zero values such that the values of those copied MSB bits are reflected in the vector mask. At 2230, the vector value of the vector mask is converted into a scalar value, is bit-shifted to the left by one bit at 2240, and is converted back to a vector value in the vector mask at 2250.

At 2260, the vector mask, now with its shifted bit values, is used to selectively fill the lanes of the other vector register (lanes selected by corresponding ones of the bit values of the vector mask) with 1's. At 2270, the other vector register is ANDed with yet another vector register to effectively filter through only LSB bits of the lanes of the other vector register such that 1's exist only at LSB bit positions within the lanes of the other vector register that had been selectively filled with 1's.

At 2280, the bit-shift to the left of the vector register storing the test bitmask D is performed to bit-shift the test bitmask D one bit position to the left. As expected, bit values at the MSB bit positions within each lane are lost (specifically bit values of 1). At 2290, those lost bit values are restored by ORing the vector register storing the test bitmask D with the other vector register.

Figure 10:
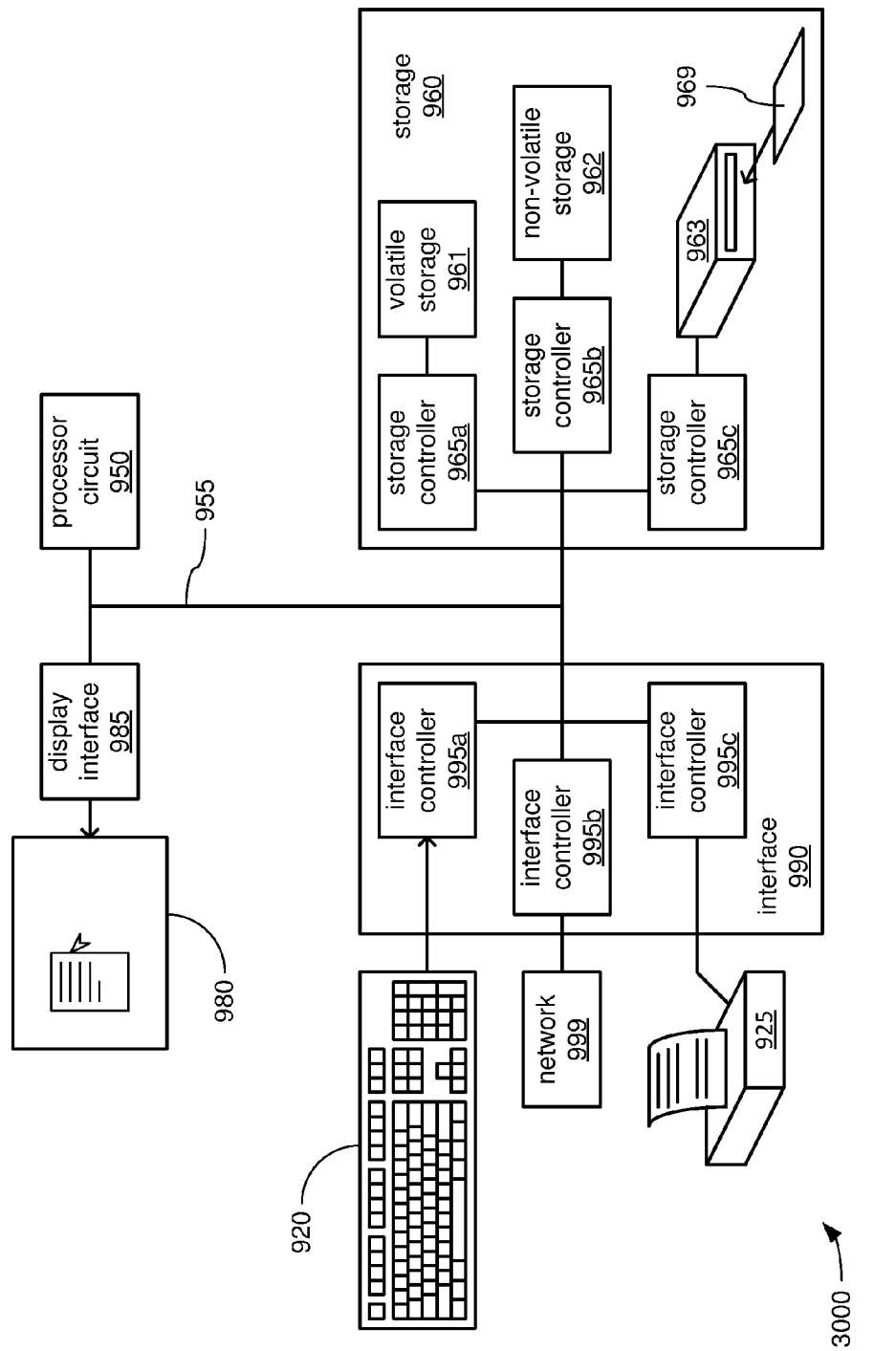
FIG. 10 illustrates an embodiment of a processing architecture.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100 and 300, as well as the controller 200. It should be noted that components of the processing architecture 3000 are given reference numbers in which the last two digits correspond to the last two digits of reference numbers of components earlier depicted and described as part of these computing devices. This is done as an aid to correlating such components of these computing devices with components of this exemplary processing architecture.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 950, a storage 960, an interface 990 to other devices, and coupling 955. Depending on various aspects of a computing device implementing the processing architecture 3000, including its intended use and/or conditions of use, such a computing device may further incorporate additional components.

The coupling 955 incorporates one or more buses, point-to-point interconnects, transceivers, buffers, crosspoint switches, and/or other conductors and/or logic that communicatively couples at least the processor element 950 to the storage 960. The coupling 955 may further couple the processor element 950 to one or more of the interface 990 and the display interface 985 (depending on which of these and/or other components are also present). With the processor element 950 being so coupled by couplings 955, the processor element 950 is able to perform the various ones of the tasks described at length, above, for the computing device 100 and/or the controller 200. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCM-CIA) bus, HyperTransport™, QuickPath, and the like.

As previously discussed, the processor element 950 (corresponding to one or more of the processor elements 150, 250 and 350) may include any of a wide variety of commercially available processors, employing any of a wide variety of technologies and implemented with one or more cores physically combined in any of a number of ways.

As previously discussed, the storage 960 (corresponding to one or more of the storages 160, 260 and 360) may include one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor element 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of removable machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may include an article of manufacture in the form of a machine-readable storage media on which a routine comprising a sequence of instructions executable by the processor element 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor element 950 as that routine is executed.

As previously discussed, the interface 990 (corresponding to the interfaces 190 and 390) may employ any of a variety of signaling technologies corresponding to any of a variety of communications technologies that may be employed to communicatively couple a computing device to one or more other devices. Again, one or both of various forms of wired or wireless signaling may be employed to enable the processor element 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also incorporate the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices 100 and 300, as well as the controller 200 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to perform string matching includes a processor element; and logic to receive a pattern comprising a first string of elements to employ in a string matching operation, instantiate a test bitmask in a first vector register of the processor element, the first vector register comprising multiple lanes, copy bit values at most significant bit (MSB) positions of the multiple lanes of the first vector register to a first vector mask as a vector value, bit-shift the vector value as a scalar value, bit-shift the first vector register, employ the vector value of the first vector mask to selectively fill least significant bit (LSB) positions of lanes of a second vector register of the processor element, and combine the second vector register into the first vector register in a bitwise logical disjunction operation.

The above example of an apparatus in which the logic is to receive a sequence comprising a second string of elements to employ in the string matching operation, the string matching operation to identify an occurrence of the pattern within the sequence.

Either of the above examples of an apparatus in which the first and second strings comprising strings of one of text or DNA sequences.

Any of the above examples of an apparatus in which the apparatus includes a display, and the logic is to visually present an indication of whether the pattern is found within the sequence.

Any of the above examples of an apparatus in which the logic is to transmit a results data indicative of whether the pattern is found within the sequence to a computing device from which at least one of the pattern and the sequence was received via a network.

Any of the above examples of an apparatus in which the string matching operation is based on a backward nondeterministic DAWG match (BNDM) algorithm.

Any of the above examples of an apparatus in which the processor element based on a single-instruction-multiple-data (SIMD) architecture.

Any of the above examples of an apparatus in which the logic is to combine the first vector register with a third vector register that serves as a MSB mask in a bitwise logical conjunction operation to copy the bit values at the MSB bit positions of the multiple lanes of the first vector register to the first vector mask, employ the vector value to selectively fill bits of the lanes of the second vector register with 1's, and combine the second vector register with a fourth vector register that serves as a LSB mask in a bitwise logical conjunction operation to selectively fill the LSB bit positions of the lanes of the second vector register.

Any of the above examples of an apparatus in which the logic is to calculate a number of the lanes of the first vector register required to store the test bitmask, the test bitmask having a bit length equal to a number of elements of the first string, employ a second vector mask to selectively fill the number of lanes of the first vector register required to store the test bitmask, and right shift a most significant lane of the number of lanes to adjust a number bits filled across all of the number of lanes to equal to the bit length of the test bitmask.

Any of the above examples of an apparatus in which the logic is to selectively fill all bits of the number of lanes of the first vector register with 1's.

Any of the above examples of an apparatus in which the logic is to initialize a bitmask indicating positions within the first string at which an element occurs in a third vector register of the processor element, combine the third vector register with the first vector register in a bitwise logical conjunction operation, and determine the bit value at the MSB bit of the test bitmask to determine whether the pattern is found within the sequence.

An example of another apparatus to perform string matching includes a processor element; and logic to receive a pattern comprising a first string of elements to employ in a string matching operation, calculate a number of the lanes of a first vector register of the processor element required to store a test bitmask having a bit length equal to a number of elements of the first string, employ a first vector mask to selectively fill the number of lanes of the first vector register required to store the test bitmask, and right shift a most significant lane of the number of lanes to adjust a number bits filled across all of the number of lanes to equal the bit length of the test bitmask.

The above example of another apparatus in which the logic is to selectively fill all bits of the number of lanes of the first vector register with 1's.

Either of the above examples of another apparatus in which the logic is to receive a sequence comprising a second string of elements to employ in the string matching operation, the string matching operation to identify an occurrence of the pattern within the sequence, initialize a bitmask indicating positions within the first string at which an element occurs in a third vector register of the processor element, combine the third vector register with the first vector register in a bitwise logical conjunction operation, and determine the bit value at the most significant bit (MSB) of the test bitmask to determine whether the pattern is found within the sequence.

Any of the above examples of another apparatus in which the first and second strings comprising strings of one of text or DNA sequences.

Any of the above examples of another apparatus in which the apparatus includes a display, and the logic is to visually present an indication of whether the pattern is found within the sequence.

Any of the above examples of another apparatus in which the logic is to transmit a results data indicative of whether the pattern is found within the sequence to a computing device from which at least one of the pattern and the sequence was received via a network.

Any of the above examples of another apparatus in which the string matching operation based on a backward nondeterministic DAWG match (BNDM) algorithm.

Any of the above examples of another apparatus in which the processor element based on a single-instruction-multiple-data (SIMD) architecture.

Any of the above examples of another apparatus in which the logic is to copy bit values at MSB bit locations of multiple lanes of the first vector register to a second vector mask as a vector value, bit-shift the vector value as a scalar value, bit-shift the first vector register, employ the vector value of the second vector mask to selectively fill LSB bit positions of lanes of a second vector register of the processor element, and combine the second vector register into the first vector register in a bitwise logical disjunction operation.

Any of the above examples of another apparatus in which the logic is to combine the first vector register with a third vector register that serves as a MSB mask in a bitwise logical conjunction operation to copy the bit values at the MSB bit positions of the number of lanes of the first vector register to the second vector mask, employ the vector value to selectively fill bits of the lanes of the second vector register with 1's, and combine the second vector register with a fourth vector register that serves as a LSB mask in a bitwise logical conjunction operation to selectively fill the LSB bit positions of the lanes of the second vector register.

An example of a computer-implemented method of performing string matching includes receiving a pattern comprising a first string of elements and a sequence comprising a second sequence of elements to employ in a string matching operation to determine whether the pattern exists within the sequence, instantiating a test bitmask in a first vector register of a processor element, the first vector register comprising multiple lanes, copying bit values at most significant bit (MSB) positions of the multiple lanes of the first vector register to a first vector mask as a vector value, bit-shifting the vector value as a scalar value, bit-shifting the first vector register, employing the vector value of the first vector mask to selectively fill least significant bit (LSB) bit positions of lanes of a second vector register of the processor element, and ORing the second vector register into the first vector register.

The above example of a computer-implemented method in which the first and second strings comprising strings of one of text or DNA sequences.

Either of the above examples of a computer-implemented method in which the method includes receiving signals conveying at least one of the pattern and the sequence from at least one of controls or a network.

Any of the above examples of a computer-implemented method in which the method includes visually presenting an indication of whether the pattern is found within the sequence on a display.

Any of the above examples of a computer-implemented method in which the method includes transmitting a results data indicative of whether the pattern is found within the sequence to a computing device from which at least one of the pattern and the sequence was received via a network.

Any of the above examples of a computer-implemented method in which the method includes employing a backward nondeterministic DAWG match (BNDM) algorithm in the string matching operation.

Any of the above examples of a computer-implemented method in which the method includes initializing a bitmask indicating positions within the first string at which an element occurs in a third vector register of the processor element, ANDing the third vector register with the first vector register, and determining the bit value at the MSB bit of the test bitmask to determine whether the pattern is found within the sequence.

An example of an apparatus to perform string matching includes means for performing any of the above examples of a computer-implemented method.

An example of at least one machine-readable storage medium includes instructions that when executed by a computing device, cause the computing device to receive a pattern comprising a first string of elements and a sequence comprising a second sequence of elements to employ in a string matching operation to determine whether the pattern exists within the sequence, instantiate a test bitmask in a first vector register of a processor element of the computing device, the first vector register comprising multiple lanes, copy bit values at most significant bit (MSB) bit positions of the multiple lanes of the first vector register to a first vector mask as a vector value, bit-shift the vector value as a scalar value, bit-shift the first vector register, employ the vector value of the first vector mask to selectively fill least significant bit (LSB) bit positions of lanes of a second vector register of the processor element, and combine the second vector register into the first vector register in a bitwise logical disjunction operation.

The above example of at least one machine-readable storage medium in which the computing device is caused to receive signals conveying at least one of the pattern and the sequence from at least one of controls of the computing or a network to which the computing device is coupled.

Either of the above examples of at least one machine-readable storage medium in which the computing device is caused to visually present an indication of whether the pattern is found within the sequence on a display of the computing device.

Any of the above examples of at least one machine-readable storage medium in which the computing device is caused to transmit a results data indicative of whether the pattern is found within the sequence to a computing device via a network to which the computing device is coupled.

Any of the above examples of at least one machine-readable storage medium in which the string matching operation based on a backward nondeterministic DAWG match (BNDM) algorithm.

Any of the above examples of at least one machine-readable storage medium in which the processor element based on a single-instruction-multiple-data (SIMD) architecture.

Any of the above examples of at least one machine-readable storage medium in which the computing device is caused to initialize a bitmask indicating positions within the first string at which an element occurs in a third vector register of the processor element, combine the third vector register with the first vector register in a bitwise logical conjunction operation, and determine the bit value at the MSB bit of the test bitmask to determine whether the pattern is found within the sequence.

An example of still another apparatus to perform string matching includes means for receiving a pattern comprising a first string of elements and a sequence comprising a second sequence of elements to employ in a string matching operation to determine whether the pattern exists within the sequence, instantiating a test bitmask in a first vector register of a processor element of the computing device, the first vector register comprising multiple lanes, copying bit values at most significant bit (MSB) bit positions of the multiple lanes of the first vector register to a first vector mask as a vector value, bit-shifting the vector value as a scalar value, bit-shifting the first vector register, employing the vector value of the first vector mask to selectively fill least significant bit (LSB) bit positions of lanes of a second vector register of the processor element, and combining the second vector register into the first vector register in a bitwise logical disjunction operation.

The above example of still another apparatus in which the apparatus includes means for receiving signals conveying at least one of the pattern and the sequence from at least one of controls of the computing or a network to which the computing device is coupled.

Either of the above examples of still another apparatus in which the apparatus includes means for visually presenting an indication of whether the pattern is found within the sequence on a display of the computing device.

Any of the above examples of still another apparatus in which the apparatus includes means for transmitting a results data indicative of whether the pattern is found within the sequence to a computing device via a network to which the computing device is coupled.

Any of the above examples of still another apparatus in which the string matching operation based on a backward nondeterministic DAWG match (BNDM) algorithm.

Any of the above examples of still another apparatus in which the processor element based on a single-instruction-multiple-data (SIMD) architecture.

Any of the above examples of still another apparatus in which the apparatus includes means for initializing a bitmask indicating positions within the first string at which an element occurs in a third vector register of the processor element, combining the third vector register with the first vector register in a bitwise logical conjunction operation, and determining the bit value at the MSB bit of the test bitmask to determine whether the pattern is found within the sequence.

The invention claimed is:

1. An apparatus comprising:
   an interface;
   a processor element coupled with the interface, the processor element comprising a first vector register and a second vector register; and
   logic, at least partially operable by the processor element, that when executed cause the processor element to:
      receive, via the interface, a pattern comprising a first string of elements to employ in a string matching operation;
      instantiate a test bitmask in the first vector register of the processor element, the first vector register comprising multiple lanes;
      copy bit values at most significant bit (MSB) positions of the multiple lanes of the first vector register to a first vector mask as a vector value;
   bit-shift the vector value as a scalar value;
      bit-shift the first vector register;
      employ the vector value of the first vector mask to selectively fill least significant bit (LSB) positions of lanes of the second vector register of the processor element; and
      combine the second vector register into the first vector register in a bitwise logical disjunction operation.

2. The apparatus of claim 1, the processor element to receive a sequence comprising a second string of elements to employ in the string matching operation, the string matching operation to identify an occurrence of the pattern within the sequence.

3. The apparatus of claim 2, comprising a display, the processor element to visually present an indication of whether the pattern is found within the sequence.

4. The apparatus of claim 2, the processor element to transmit, via the interface, a results data indicative of whether the pattern is found within the sequence to a computing device from which at least one of the pattern and the sequence was received via the interface.

5. The apparatus of claim 1, the processor element based on a single-instruction-multiple-data (SIMD) architecture.

6. The apparatus of claim 1, the processor element to:
combine the first vector register with a third vector register that serves as a MSB mask in a bitwise logical conjunction operation to copy the bit values at the MSB bit positions of the multiple lanes of the first vector register to the first vector mask;
employ the vector value to selectively fill bits of the lanes of the second vector register with 1's; and
combine the second vector register with a fourth vector register that serves as a LSB mask in a bitwise logical conjunction operation to selectively fill the LSB bit positions of the lanes of the second vector register.

7. The apparatus of claim 1, the processor element to:
calculate a number of the lanes of the first vector register required to store the test bitmask, the test bitmask having a bit length equal to a number of elements of the first string;
employ a second vector mask to selectively fill the number of lanes of the first vector register required to store the test bitmask; and
right shift a most significant lane of the number of lanes to adjust a number bits filled across all of the number of lanes to equal to the bit length of the test bitmask.

8. The apparatus of claim 7, the processor element to selectively fill all bits of the number of lanes of the first vector register with 1's.

9. The apparatus of claim 1, the processor element to:
initialize a bitmask indicating positions within the first string at which an element occurs in a third vector register of the processor element;
combine the third vector register with the first vector register in a bitwise logical conjunction operation; and
determine the bit value at the MSB bit of the test bitmask to determine whether the pattern is found within the sequence.

10. An apparatus comprising:
an interface;
a processor element coupled with the interface, the processor element comprising a first vector register; and
logic, at least partially operable on the processor element, that when executed cause the processor element to:
receive, via the interface, a pattern comprising a first string of elements to employ in a string matching operation;
calculate a number of the lanes of first vector register of the processor element required to store a test bitmask having a bit length equal to a number of elements of the first string;
employ a first vector mask to selectively fill the number of lanes of the first vector register required to store the test bitmask; and
right shift a most significant lane of the number of lanes to adjust a number bits filled across all of the number of lanes to equal the bit length of the test bitmask.

11. The apparatus of claim 10, the processor element to selectively fill all bits of the number of lanes of the first vector register with 1's.

12. The apparatus of claim 10, the processor element to:
receive a sequence comprising a second string of elements to employ in the string matching operation, the string matching operation to identify an occurrence of the pattern within the sequence;
initialize a bitmask indicating positions within the first string at which an element occurs in a third vector register of the processor element;
combine the third vector register with the first vector register in a bitwise logical conjunction operation; and
determine the bit value at the most significant bit (MSB) of the test bitmask to determine whether the pattern is found within the sequence.

13. The apparatus of claim 10, the processor element to:
copy bit values at MSB bit locations of multiple lanes of the first vector register to a second vector mask as a vector value;
bit-shift the vector value as a scalar value;
bit-shift the first vector register;
employ the vector value of the second vector mask to selectively fill LSB bit positions of lanes of a second vector register of the processor element; and
combine the second vector register into the first vector register in a bitwise logical disjunction operation.

14. The apparatus of claim 13, the processor element to:
combine the first vector register with a third vector register that serves as a MSB mask in a bitwise logical conjunction operation to copy the bit values at the MSB bit positions of the number of lanes of the first vector register to the second vector mask;
employ the vector value to selectively fill bits of the lanes of the second vector register with 1's; and
combine the second vector register with a fourth vector register that serves as a LSB mask in a bitwise logical conjunction operation to selectively fill the LSB bit positions of the lanes of the second vector register.

15. A computer-implemented method comprising:
receiving a pattern comprising a first string of elements and a sequence comprising a second sequence of elements to employ in a string matching operation to determine whether the pattern exists within the sequence;
instantiating a test bitmask in a first vector register of a processor element, the first vector register comprising multiple lanes;
copying bit values at most significant bit (MSB) positions of the multiple lanes of the first vector register to a first vector mask as a vector value;
bit-shifting the vector value as a scalar value;
bit-shifting the first vector register;
employing the vector value of the first vector mask to selectively fill least significant bit (LSB) bit positions of lanes of a second vector register of the processor element; and
ORing the second vector register into the first vector register.

16. The computer-implemented method of claim 15, comprising receiving signals conveying at least one of the pattern and the sequence from at least one of controls or a network.

17. The computer-implemented method of claim 15, comprising visually presenting an indication of whether the pattern is found within the sequence on a display.

18. The computer-implemented method of claim 15, comprising transmitting a results data indicative of whether the pattern is found within the sequence to a computing device from which at least one of the pattern and the sequence was received via a network.

19. The computer-implemented method of claim 15, comprising employing a backward nondeterministic DAWG match (BNDM) algorithm in the string matching operation.

20. The computer-implemented method of claim 15, comprising:
initializing a bitmask indicating positions within the first string at which an element occurs in a third vector register of the processor element;
ANDing the third vector register with the first vector register; and determining the bit value at the MSB bit of the test bitmask to determine whether the pattern is found within the sequence.

21. At least one non-transitory machine-readable storage medium comprising instructions that when executed by a computing device, cause the computing device to:
 receive a pattern comprising a first string of elements and a sequence comprising a second sequence of elements to employ in a string matching operation to determine whether the pattern exists within the sequence;
 instantiate a test bitmask in a first vector register of a processor element of the computing device, the first vector register comprising multiple lanes;
 copy bit values at most significant bit (MSB) bit positions of the multiple lanes of the first vector register to a first vector mask as a vector value;
 bit-shift the vector value as a scalar value;
 bit-shift the first vector register;
 employ the vector value of the first vector mask to selectively fill least significant bit (LSB) bit positions of lanes of a second vector register of the processor element; and
 combine the second vector register into the first vector register in a bitwise logical disjunction operation.

22. The at least one non-transitory machine-readable storage medium of claim 21, the computing device caused to receive signals conveying at least one of the pattern and the sequence from at least one of controls of the computing or a network to which the computing device is coupled.

23. The at least one non-transitory machine-readable storage medium of claim 21, the computing device caused to visually present an indication of whether the pattern is found within the sequence on a display of the computing device.

24. The at least one non-transitory machine-readable storage medium of claim 21, the computing device caused to transmit a results data indicative of whether the pattern is found within the sequence to a computing device via a network to which the computing device is coupled.

25. The at least one non-transitory machine-readable storage medium of claim 21, the computing device caused to:
 initialize a bitmask indicating positions within the first string at which an element occurs in a third vector register of the processor element;
 combine the third vector register with the first vector register in a bitwise logical conjunction operation; and
 determine the bit value at the MSB bit of the test bitmask to determine whether the pattern is found within the sequence.

* * * * *